United States Patent
Jansen et al.

(10) Patent No.: US 10,565,042 B2
(45) Date of Patent: Feb. 18, 2020

(54) BUS FAILURE DETECTION TRANSCEIVER ARCHITECTURE AND TRANSCEIVER OPERATION METHOD

(71) Applicant: European Space Agency, Paris (FR)

(72) Inventors: Richard Jansen, Oegstgeest (NL); Scott Lindner, Zurich (CH); Boris Glass, Noordwijk (NL); Gianluca Furano, Noordwijk (NL)

(73) Assignee: European Space Agency, Paris (FR)

( * ) Notice: Subject to any disclaimer, the term of this patent is extended or adjusted under 35 U.S.C. 154(b) by 227 days.

(21) Appl. No.: 15/737,455

(22) PCT Filed: Jun. 18, 2015

(86) PCT No.: PCT/EP2015/063762
§ 371 (c)(1),
(2) Date: Dec. 18, 2017

(87) PCT Pub. No.: WO2016/202396
PCT Pub. Date: Dec. 22, 2016

(65) Prior Publication Data
US 2018/0189129 A1    Jul. 5, 2018

(51) Int. Cl.
*G06F 11/07* (2006.01)
*G06F 11/30* (2006.01)
(Continued)

(52) U.S. Cl.
CPC ...... *G06F 11/0745* (2013.01); *G06F 11/0796* (2013.01); *G06F 11/3027* (2013.01);
(Continued)

(58) Field of Classification Search
CPC .................. G06F 11/0745; G06F 11/0796
See application file for complete search history.

(56) References Cited

U.S. PATENT DOCUMENTS

| 6,150,845 A | 11/2000 | Morrill |
|---|---|---|
| 2004/0158781 A1 | 8/2004 | Pihet |

(Continued)

OTHER PUBLICATIONS

International Search Report and Written Opinion for related PCT application No. PCT/EP2015/063762 dated Feb. 8, 2016.

*Primary Examiner* — Jigar P Patel
(74) *Attorney, Agent, or Firm* — Procopio, Cory, Hargreaves & Savitch LLP

(57) ABSTRACT

A transceiver for imparting a voltage signal on a differential signaling bus, involving an output terminal and a string of one or more transistors connected between the output terminal and a predetermined voltage level. The transceiver can be switched between an active state in which the predetermined voltage level is applied to the output terminal, and an inactive state in which the predetermined voltage level is not applied to the output terminal. Methods for the transceiver can involve a detection step of detecting a first quantity depending on a current flowing through a first transistor in the string of transistors, a failure determination step of determining whether the detected first quantity satisfies one or more error conditions, and a control step of switching the transceiver to the inactive state if the detected first quantity is determined to satisfy at least one of the one or more error conditions.

18 Claims, 17 Drawing Sheets

(51) Int. Cl.
*G06F 13/40* (2006.01)
*G06F 13/42* (2006.01)
*H02H 3/20* (2006.01)
*H04L 25/02* (2006.01)

(52) U.S. Cl.
CPC .......... *G06F 13/4068* (2013.01); *G06F 13/42* (2013.01); *H02H 3/20* (2013.01); *H04L 25/02* (2013.01)

(56) References Cited

U.S. PATENT DOCUMENTS

| | | | |
|---|---|---|---|
| 2006/0232896 A1* | 10/2006 | Maue | H02H 7/0851 361/23 |
| 2009/0206794 A1* | 8/2009 | Ferguson | H02J 7/0021 320/134 |
| 2014/0239713 A1* | 8/2014 | Kanzaki | H02J 1/00 307/11 |
| 2014/0359190 A1 | 12/2014 | Metzner et al. | |
| 2015/0009598 A1 | 1/2015 | Trombetti | |

* cited by examiner

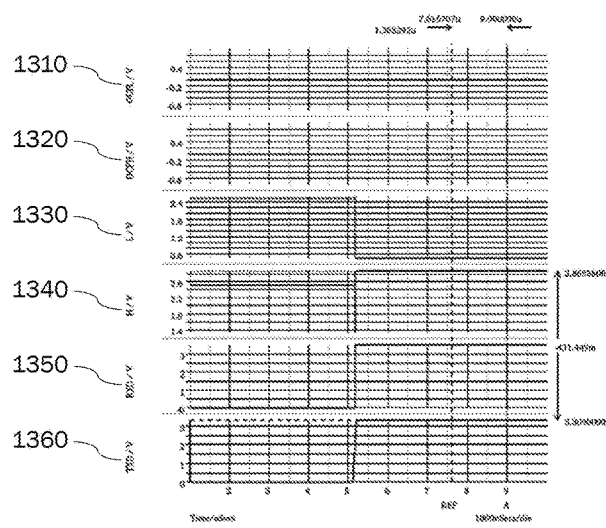
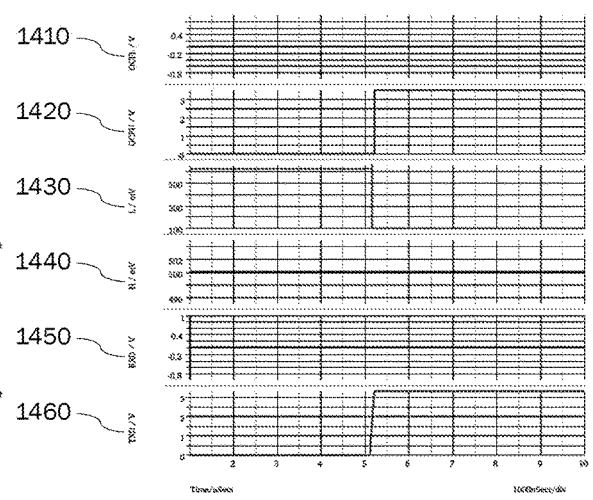
Fig. 13
Fig. 14

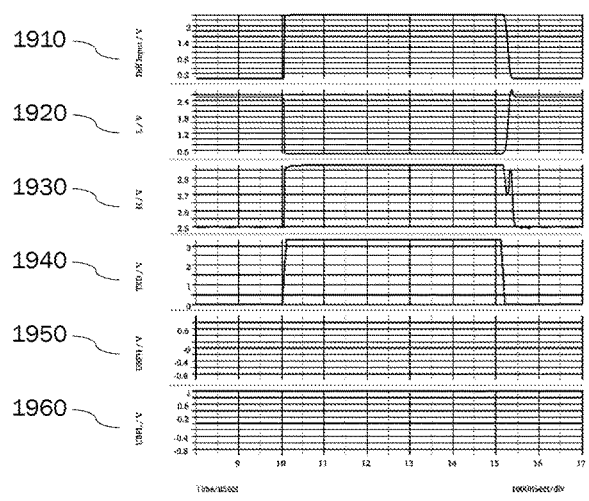
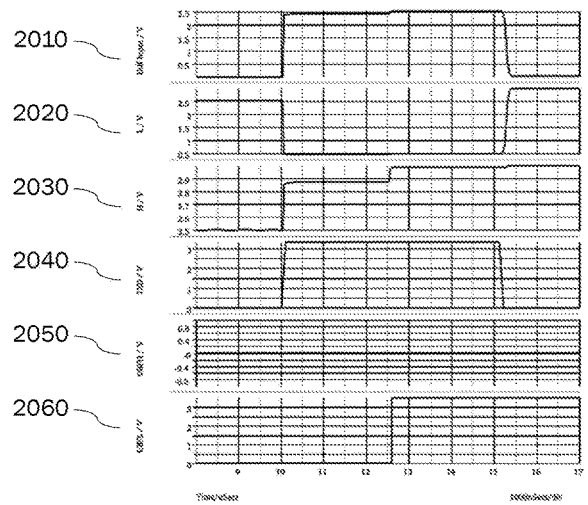
Fig. 19
Fig. 20

BUS FAILURE DETECTION TRANSCEIVER ARCHITECTURE AND TRANSCEIVER OPERATION METHOD

CROSS-REFERENCE TO RELATED APPLICATIONS

This application is a U.S. National Stage entry of PCT Application No. PCT/EP2015/063762, filed on Jun. 18, 2015, the entire contents of which are hereby incorporated by reference.

TECHNICAL FIELD

This application relates to a method of operating a transceiver for imparting a voltage signal on a differential signaling bus, and to a transceiver for imparting a voltage signal on a differential signaling bus.

BACKGROUND

In spacecraft, the MIL-BUS 1553B communication bus is used by the on-board computer for the control and monitoring of the spacecraft's platform and payload. The implementation of this bus is bulky, power consuming and limited in the number of terminals that can be attached to the bus. With increasing complexity of spacecraft, the number of units on the platform and payload to be controlled increases for a decreasing weight and power budget. These new requirements can be met by the Controller Area Network (CAN) bus, which has been developed for automotive control applications. The CAN bus communication protocol has been used in several spacecraft mainly in low earth orbits with the communication physical layer implemented with up-screened commercial CAN transceivers. For geostationary orbits, which present a harsher radiation environment, a radiation tolerant transceiver is required.

Further, conventional CMOS processes are not optimized for high current throughput as would be required for a CAN transceiver, which results in a high voltage drop between the supply voltage level and the differential dominant output voltage level. For instance, for a 3V supply voltage level, it would be difficult to even attain a 1.5V differential dominant output voltage level.

In addition, unlike the MIL-BUS 1553B bus that is used between units and is limited to 30 nodes, the CAN bus can have in excess of 100 nodes from inter and intra equipment units. The addition of sub-branches on the bus can increase this number ten to hundred fold. For such number of interfaces, the conventional approach of using a separate transceiver to translate the CMOS signal from the CAN controller to the CAN bus levels is no longer feasible and efficient integration of the transceiver with the digital should be sought. This implies that instead of using a special high-voltage analog CMOS process to meet the CAN electrical and radiation requirements for the transceiver, a digital CMOS process, as also used for the CAN controller, should be used. However, these radiation tolerant digital processes have not been optimized for high voltage capability.

Thus, there is a need for a transceiver for a differential signaling bus that does not suffer from high voltage drop between the supply voltage level and the dominant differential voltage level. There is a further need for a radiation tolerant transceiver. There is a yet further need for a radiation tolerant and high voltage tolerant transceiver.

SUMMARY

In view of these needs, the present document proposes a method of operating a transceiver for imparting a voltage signal on a differential signaling bus and a transceiver for imparting a voltage signal on a differential signaling bus, having the features of the respective independent claims.

An aspect of the disclosure relates to a method of operating a transceiver for imparting a voltage signal on a differential signaling bus. The transceiver may comprise an output terminal (output port) and a string of one or more transistors connected between the output terminal and a predetermined voltage level. The transceiver may be switched between an active state in which the predetermined voltage level is applied to the output terminal, and an inactive (passive) state in which the predetermined voltage level is not applied to the output terminal. The active state may correspond to the dominant state of the transceiver, and the inactive state may correspond to the recessive state of the transceiver. The transceiver may not include any reverse current bus port diodes for the output terminal. The method may comprise a detection step of detecting (determining) a first quantity depending on a current flowing through a first transistor (monitored transistor) in the string of transistors. The first quantity may be detected during the active state of the transceiver. The method may further comprise a failure determination step of determining whether the detected first quantity satisfies one or more error conditions (fault conditions). The method may yet further comprise a control step of switching the transceiver to the inactive state if the detected first quantity is determined to satisfy at least one of the one or more error conditions.

Employing the proposed method, by returning the transceiver to the inactive state, the transceiver can be reliably protected from a plurality of fault conditions that could otherwise damage the transceiver. Notably, said protection is achieved in an active manner, i.e. by switching the transceiver to the inactive state. Therefore, providing one or more protection diodes (reverse current bus port diodes) in the transceiver (i.e. in a bus-driver circuit of the transceiver) is not required. Conventionally, such diodes are not optimized for high current throughput, so that providing appropriately dimensioned protection diodes would result in a considerable voltage drop between the predetermined voltage level and a voltage level at the output terminal in dominant mode. Accordingly, the proposed method allows to reduce the voltage drop. By continuously monitoring the first quantity, a number of fault states of the differential signaling bus, including over-current conditions resulting e.g. from bus single shorts or bus double shorts, can be detected, and fault propagation can be prevented. By switching the transceiver to the inactive state on occurrence of a bus fault condition, aggravation and continued exposure of the transceiver to the bus fault condition can be prevented, and the transceiver can be protected from damage.

Further, it is known that analog-specific devices, such as high current capable diodes, are not available on a standard digital process. Thus, by obviating the need for employing high current capable protection diodes in the transceiver, the presented method allows for integration of the transceiver with the digital circuits of the bus control (e.g. CAN control) and the interface. Thus, a radiation tolerant transceiver can be realized in standard radiation tolerant digital processes available e.g. for space applications.

In addition, the proposed method including bus fault detection and driver protection allows also for detection of a bus fault state and for preventing fault propagation. Employing the proposed method, Single or double short circuit failures of the differential signaling bus as well as single and double open lines of the differential signaling bus can be identified.

In embodiments, the detection step may involve detecting a second quantity indicative of a current flowing through the first transistor in a first direction. The second quantity may be an example of the first quantity. The first direction may be a reverse-bias direction. The failure determination step may involve comparing the detected second quantity to a first threshold. The failure determination step may further comprise determining that the first quantity satisfies an error condition if the detected second quantity exceeds the first threshold.

In embodiments, the detection step may involve detecting a third quantity indicative of a current flowing through the first transistor in a second direction. The third quantity may be another example of the first quantity. The second direction may be the opposite of the first direction. For example, the second direction may be a forward-bias direction. The failure determination step may involve comparing the detected third quantity to a second threshold. The failure determination step may further comprise determining that the first quantity satisfies an error condition if the detected third quantity exceeds the second threshold.

Accordingly, the proposed method is capable of detecting an over-current flowing through the output terminal of the transceiver both in reverse-bias direction (reverse-bias mode) and forward-bias direction (forward-bias mode). Therein, the forward-bias direction corresponds to a current flowing out of an output terminal (H terminal) connected to an H line (higher voltage line) of the differential signaling bus, i.e. into the H line, or to a current flowing into an output terminal (L terminal) connected to a L line (lower voltage line) of the differential signaling bus, i.e. out of the L line. The reverse-bias direction corresponds to a current flowing into the output terminal connected to the H line, i.e. out of the H line, or to a current flowing out of the output terminal connected to the L line, i.e. into the L line. By switching off of the driver (i.e. returning the transceiver to the inactive state) on detection of such over-current, the transceiver can be protected from damage, in particular without resorting to protection diodes for preventing a reverse-bias current.

In embodiments, the detection step may involve detecting a fourth quantity indicative of an integrated value of sample values of respective currents flowing through the first transistor at timings towards respective ends of periods in a sequence of periods in which the transceiver is in the active state. The fourth quantity may be another example of the first quantity. A timing towards an end of a period in which the transceiver is in the active state may be understood as a timing during said period at which the current flowing through e.g. the first transistor and the voltage at e.g. the first transistor have settled, e.g. after an initial phase of fluctuation. The failure determination step may involve comparing the detected fourth quantity to a third threshold. The failure determinations step may further comprise determining that the first quantity satisfies an error condition if the detected fourth quantity does not exceed the third threshold.

By sampling the current at the output terminal during the active state, the proposed method is capable of detecting an under-current condition arising during the active state. In addition to protecting the driver from taking damage, a fault state of the differential signaling bus can be detected by the proposed method, and failure propagation can be prevented.

In embodiments, the detection step may involve providing a second transistor (detection transistor) that is a scaled copy (replica) of the first transistor (monitored transistor). The detection step may further comprise applying the same voltages to the terminals of the second transistor that are present at respective terminals of the first transistor. The second and third quantities may be indicative of a current flowing through the second transistor. Detecting the fourth quantity may involve intermittently charging a capacitor at the timings towards the respective ends of said periods by a voltage derived from the current flowing through the second transistor. The fourth quantity may be indicative of a voltage across the capacitor.

In embodiments, the transceiver may further comprise a second output terminal and a second string of one or more transistors connected between the second output terminal and a second predetermined voltage level. The second predetermined voltage level may be applied to the second output terminal during the active state of the transceiver, and the second predetermined voltage level may not be applied to the second output terminal during the inactive state of the transceiver. The detection step may involve detecting a fifth quantity indicative of an integrated value of sample values of respective differences between the current flowing in the first transistor and a current flowing in a third transistor (monitored transistor) in the second string at timings towards respective ends of periods in a sequence of periods in which the transceiver is in the active state. The fifth quantity may be indicative of a magnitude of said integrated value. The fifth quantity may be another example of the first quantity. A timing towards an end of a period in which the transceiver is in the active state may be understood as a timing during said period at which the current flowing through e.g. the first transistor and the voltage at e.g. the first transistor have settled, e.g. after an initial phase of fluctuation. The failure determination step may involve comparing the detected fifth quantity to a fourth threshold. The failure determination step may further involve determining that the first quantity satisfies an error condition if the detected fifth quantity exceeds the fourth threshold.

By sampling the difference current at the output terminals during the active state, the proposed method is capable of detecting an imbalance between currents flowing through the output terminals of the transceiver during the active state. Thereby, in addition to protecting the driver from taking damage, a fault state of the differential signaling bus can be detected by the proposed method, and failure propagation can be prevented.

In embodiments, the detection step may involve providing a fourth transistor (detection transistor) that is a scaled copy (replica) of the third transistor (monitored transistor). The detection step may further involve applying the same voltages to the terminals of the fourth transistor that are present at respective terminals of the third transistor. Detecting the fifth quantity may involve intermittently charging a second capacitor at the timings towards the respective ends of said periods by a voltage derived from a difference between a current flowing through the second transistor and a current flowing through the fourth transistor. The fifth quantity may be indicative of a voltage across the second capacitor.

In embodiments, the method may comprise detecting a sixth quantity depending on a voltage level at the output terminal. The method may further comprise comparing the detected sixth quantity to at least one fifth threshold. The method may yet further comprise switching the transceiver to the inactive state if the detected sixth quantity is not within a range determined by the at least one fifth threshold.

By sampling the differential voltage between the output terminals of the transceiver during the active state, the proposed method is capable of detecting insufficient differential voltage, which may be indicative of a fault of the differential signaling bus. Thus, in addition to protecting the driver from taking damage, a fault state of the differential signaling bus can be detected by the proposed method, and failure propagation can be prevented.

In embodiments, the transceiver may further comprise a second output terminal and a second string of one or more transistors connected between the second output terminal and a second predetermined voltage level. The second predetermined voltage level may be applied to the second output terminal during the active state of the transceiver, and the second predetermined voltage level may not be applied to the second output terminal during the inactive state of the transceiver. The detection step may involve detecting a seventh quantity depending on a difference between the voltage level at the (first) output terminal and a voltage level at the second output terminal. The seventh quantity may be determined (sampled) at a timing towards an end of a period in which the transceiver is in the active state. The failure determination step may involve comparing the detected seventh quantity to a sixth threshold. The control step may involve switching the transceiver to the inactive state if the detected seventh quantity does not exceed the sixth threshold.

By sampling the differential voltage between the output terminals of the transceiver during the active state, the proposed method is capable of detecting an under-voltage condition for the differential voltage arising during the active state. Thereby, in addition to protecting the driver from taking damage, a fault state of the differential signaling bus can be detected, and failure propagation can be prevented.

As mentioned above, the second to fifth quantities may relate to examples (implementations) of the first quantity. It is understood that any combination of the second to fifth quantities may be determined at the same time, and that the transceiver may be switched to the inactive state if any of the detected quantities satisfies its respective error condition (fault condition). Additionally, any or all of the sixth and seventh quantities may be detected, and the transceiver may be switched to the inactive state if any of the detected sixth or seventh quantities satisfies its respective error condition (fault condition). Notably, the second to fourth quantities and the sixth quantity may be detected for any or both the H line and the L line output terminals (H and L terminals) of the transceiver.

Another aspect of the disclosure relates to a transceiver for imparting a voltage signal on a differential signaling bus. The transceiver may comprise an output terminal (output port) and a string of one or more transistors connected between the output terminal and a predetermined voltage level. The transceiver may be switchable between an active state in which the predetermined voltage level is applied to the output terminal, and an inactive (passive) state in which the predetermined voltage level is not applied to the output terminal. The active state may correspond to the dominant state of the transceiver, and the inactive state may correspond to the recessive state of the transceiver. The transceiver may not include any reverse current bus port diodes for the output terminal. The transceiver may further comprise a current detector (current detection circuit) for detecting (determining) a first quantity depending on a current flowing through a first transistor (monitored transistor) in the string of transistors. The current detector may be adapted to detect the first quantity during the active state of the transceiver. The transceiver may further comprise a failure determination circuit for determining whether the detected first quantity satisfies one or more error conditions (fault conditions). The transceiver may yet further comprise a control circuit for switching the transceiver to the inactive state if the detected first quantity is determined to satisfy at least one of the one or more error conditions.

In embodiments, the current detector may be adapted to detect a second quantity indicative of a current flowing through the first transistor in a first direction. The second quantity may be an example of the first quantity. The first direction may be a reverse-bias direction. The failure determination circuit may comprise a first comparator that is adapted to compare the detected second quantity to a first threshold and to output a first error flag indicating that the first quantity satisfies an error condition if the detected second quantity exceeds the first threshold. The control circuit may be adapted to switch the transceiver to the inactive state if the first error flag is raised.

In embodiments, the current detector may be adapted to detect a third quantity indicative of a current flowing through the first transistor in a second direction. The third quantity may be another example of the first quantity. The second direction may be the opposite of the first direction. For example, the second direction may be a forward-bias direction. The failure determination circuit may comprise a second comparator that is adapted to compare the detected third quantity to a second threshold and to output a second error flag indicating that the first quantity satisfies an error condition if the detected third quantity exceeds the second threshold. The control circuit may be adapted to switch the transceiver to the inactive state if the second error flag is raised.

In embodiments, the current detector may be adapted to detect a fourth quantity indicative of an integrated value of sample values of respective currents flowing through the first transistor at timings towards respective ends of periods in a sequence of periods in which the transceiver is in the active state. The fourth quantity may be another example of the first quantity. A timing towards an end of a period in which the transceiver is in the active state may be understood as a timing during said period at which the current flowing through e.g. the first transistor and the voltage at e.g. the first transistor have settled, e.g. after an initial phase of fluctuation. The failure determination circuit may comprise a third comparator that is adapted to compare the detected fourth quantity to a third threshold and to output a third error flag indicating that the first quantity satisfies an error condition if the detected fourth quantity does not exceed the third threshold. The control circuit may be adapted to switch the transceiver to the inactive state if the third error flag is raised.

In embodiments, the current detector may comprise a second transistor (detection transistor) that is a scaled copy (replica) of the first transistor (monitored transistor). The current detector may further comprise a supply circuit adapted to apply the same voltages to the terminals of the second transistor that are present at respective terminals of the first transistor. The second and third quantities may be indicative of a current flowing through the second transistor. The current detector may further comprise a capacitor and switching means for intermittently charging the capacitor. The current detector may be adapted to detect the fourth quantity by intermittently charging the capacitor at the timings towards the respective ends of said periods by a voltage derived from the current flowing through the second transistor. The fourth quantity may be indicative of a voltage across the capacitor.

In embodiments, the transceiver may further comprise a second output terminal and a second string of one or more transistors connected between the second output terminal and a second predetermined voltage level. The transceiver may be adapted to apply the second predetermined voltage level to the second output terminal during the active state of the transceiver, and to not apply the second predetermined voltage level to the second output terminal during the inactive state of the transceiver. The current detector may be adapted to detect a fifth quantity indicative of an integrated value of a difference between the current flowing in the first transistor and a current flowing in a third transistor (monitored transistor) in the second string. The fifth quantity may be indicative of a magnitude of said integrated value. The fifth quantity may be another example of the first quantity. A timing towards an end of a period in which the transceiver is in the active state may be understood as a timing during said period at which the current flowing through e.g. the first transistor and the voltage at e.g. the first transistor have settled, e.g. after an initial phase of fluctuation. The failure determination circuit may comprise a fourth comparator adapted to compare the detected fifth quantity to a fourth threshold, and to output a fourth error flag indicating that the first quantity satisfies an error condition if the detected fifth quantity exceeds the fourth threshold. The control circuit may be adapted to switch the transceiver to the inactive state if the fourth error flag is raised.

In embodiments, the current detector may comprise a fourth transistor (detection transistor) that is a scaled copy (replica) of the third transistor (monitored transistor). The current detector may further comprise a second supply circuit adapted to apply the same voltages to the terminals of the fourth transistor that are present at respective terminals of the third transistor. The current detector may further comprise a second capacitor. The current detector may yet further comprise second switching means for intermittently charging the second capacitor. The current detector may be adapted to intermittently charge the second capacitor at the timings towards the respective ends of said periods by a voltage derived from a difference between a current flowing through the second transistor and a current flowing through the fourth transistor. The fifth quantity may be indicative of a voltage across the second capacitor.

In embodiments, the transceiver may further comprise a voltage detector (voltage detection circuit) for detecting a sixth quantity depending on a voltage level at the output terminal. The transceiver may further comprise circuitry for comparing the detected sixth quantity to at least one fifth threshold and for outputting a fifth error flag if the detected sixth quantity is not within a range determined by the at least one fifth threshold. The control circuit may be adapted to switch the transceiver to the inactive state if the fifth error flag is raised.

In embodiments, the transceiver may further comprise a second output terminal and a second string of one or more transistors connected between the second output terminal and a second predetermined voltage level. The transceiver may be adapted to apply the second predetermined voltage level to the second output terminal during the active state of the transceiver, and to not apply the second predetermined voltage level to the second output terminal during the inactive state of the transceiver. The transceiver may further comprise a voltage detector (voltage detection circuit) for detecting a seventh quantity depending on a difference between the voltage level at the (first) output terminal and a voltage level at the second output terminal. The transceiver may further comprise circuitry for comparing the detected seventh quantity to a sixth threshold and for outputting a sixth error flag if the detected seventh quantity does not exceed the sixth threshold. The control circuit may be adapted to switch the transceiver to the inactive state if the sixth error flag is raised.

It will be appreciated that method steps and apparatus features may be interchanged in many ways. In particular, the details of the disclosed apparatus can be implemented as a method, and vice versa, as the skilled person will appreciate.

BRIEF DESCRIPTION OF THE FIGURES

Embodiments of the disclosure are explained below in an exemplary manner with reference to the accompanying drawings, wherein FIG. 1 schematically illustrates a block diagram of an example of a transceiver according to embodiments of the disclosure;

FIG. 13 through FIG. 22 schematically illustrate waveforms of electric quantities that may arise during operation of the transceiver of FIG. 1.

DETAILED DESCRIPTION

In the following, the invention will be described in an exemplary manner with reference to the appended figures. Identical elements in the figures may be indicated by identical reference numbers, and repeated description thereof may be omitted.

Figure 1:
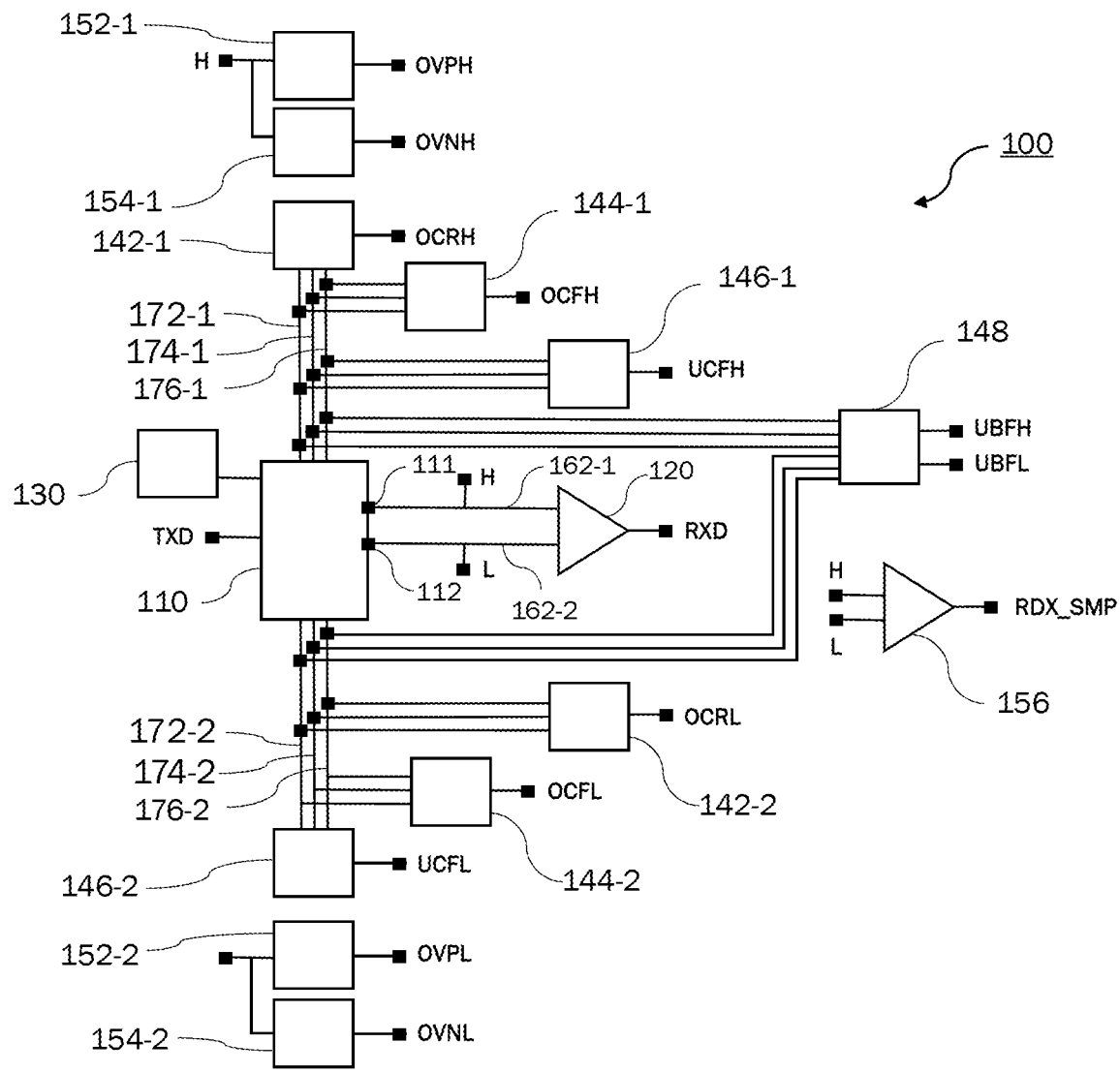

FIG. 1 schematically illustrates a block diagram of an example of a transceiver 100 according to embodiments of the disclosure. The transceiver 100 comprises a bus-driver circuit (bus-driver block) 110, a bus-receiver circuit (bus-receiver block) 120, a control circuit (control block) 130, as well as one or more fault detection circuits (fault detection blocks) 142-1, 142-2, 144-1, 144-2, 146-1, 146-2, 148, 152-1, 152-2, 154-1, 154-2, 156.

The bus-driver circuit 110 comprises first and second output terminals (H terminal and L terminal) 111, 112 connected to respective signal lines (H line and L line) 162-1, 162-2 of a differential signaling bus (e.g. a CAN bus). The transceiver 100 may be switched between an active state (dominant state) and an inactive state (recessive state) in accordance with a transmission signal TXD. Accordingly, the bus-driver circuit 110 may be adapted to impart a voltage signal on the differential signaling bus in accordance with the transmission signal TXD. The transmission signal TXD may be a binary signal, for example. During the active state of the transceiver 100, the bus-driver circuit 110 may impart a first predetermined voltage level (e.g. a supply voltage VDD) on the first signal line 162-1 of the differential signaling bus, and a second predetermined voltage level (e.g. a ground voltage VSS) on the second signal line 162-2 of the differential signaling bus. The first and second predetermined voltage levels may be chosen such that a sufficiently large differential voltage is realized across the terminal impedance of the differential signaling bus during the active state. During the inactive state of the transceiver 100, the bus-driver circuit 110 may not impart the first and second voltage levels on the first and second signal lines 162-1, 162-2, respectively. Instead, the bus-driver circuit 110 may apply a high impedance to the first and second output terminals 111, 112.

Summarizing, the H and L terminals are connected to the differential signaling bus and the remaining ports of the bus-driver circuit 110 are connected to the control circuit 130 of the transceiver 100. The inputs for the transceiver 100 are the supplies VDD and VSS, driver activation and bus dominant state selection input (transmission signal) TXD, and a bus current and voltage sampling input (sampling signal, sampling clock). The remainder of the ports of the transceiver 100 are outputs indicating the state of the driver and the bus, including one or more error flags described below.

The bus-receiver circuit 120 comprises first and second input terminals respectively connected to the first and second signal lines 162-1, 162-2. The bus-receiver circuit 120 is adapted to generate a received signal RXD based on an analysis of the voltage levels at its input terminals. More precisely, the bus-receiver circuit 120 is adapted to generate the received signal RXD based on a differential voltage corresponding to a difference between the voltage levels at its input terminals (or, in more general terms based on a difference between the voltage levels at the first and second signal lines 162-1, 162-2) of the differential signaling bus.

Figure 2:
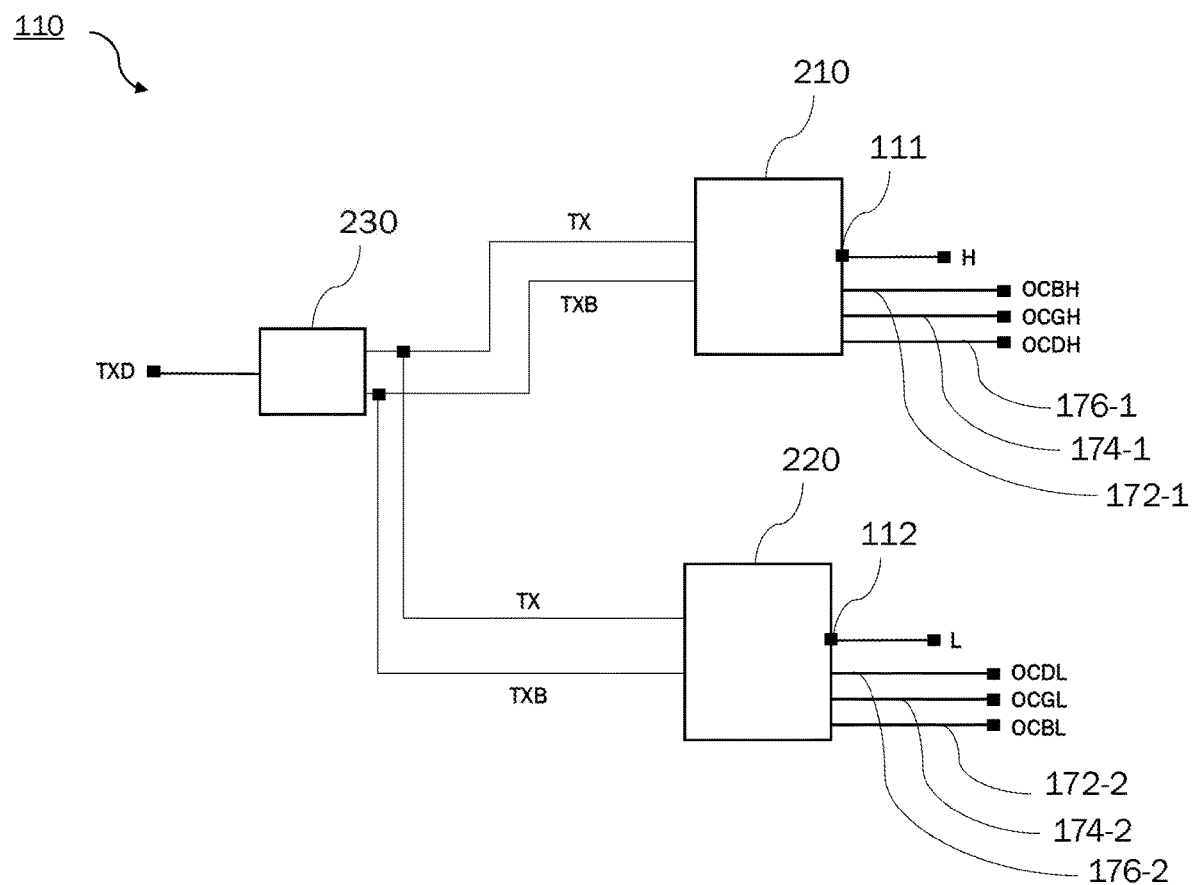
FIG. 2 schematically illustrates a block diagram of an example of a bus-driver circuit of the transceiver of FIG. 1.

The bus-driver circuit 110 is illustrated in more detail in FIG. 2. The bus-driver circuit 110 may comprise a control signal generation circuit (control signal generation block) 230 for generating first and second (binary) control signals TX, TXB based on the transmission signal TXD. The first and second control signals TX, TXB may be complementary to each other. The control signal generation circuit 230 may comprise one or more inverters for generating the first and second control signals TX, TXB. The bus-driver circuit 110 may further comprise first and second bi-state driver circuits 210, 220 respectively connected to the first and second output terminals 111, 112. The first bi-state driver circuit 210 may be a pull-up circuit for switching the first signal line 162-1 between the first predetermined voltage level (e.g. the supply voltage VDD) and the aforementioned high impedance state. The second bi-state driver circuit 220 may be a pull-down circuit for switching the second signal line 162-2 between the second predetermined voltage level (e.g. the ground voltage VSS) and said high impedance state.

Figure 3:
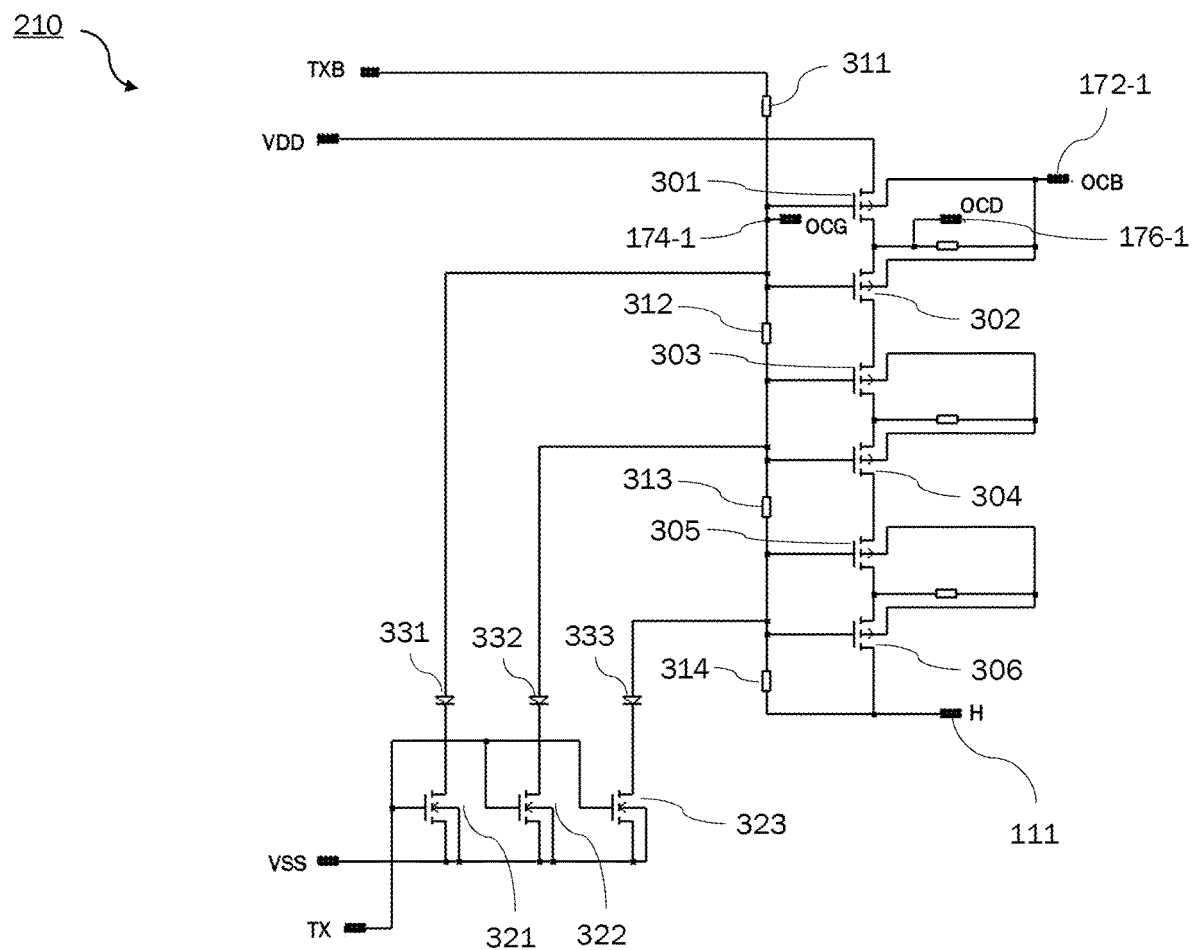
FIG. 3 and FIG. 4 schematically illustrate examples of bi-state driver circuits of the bus-driver circuit of FIG. 2.
Figure 4:
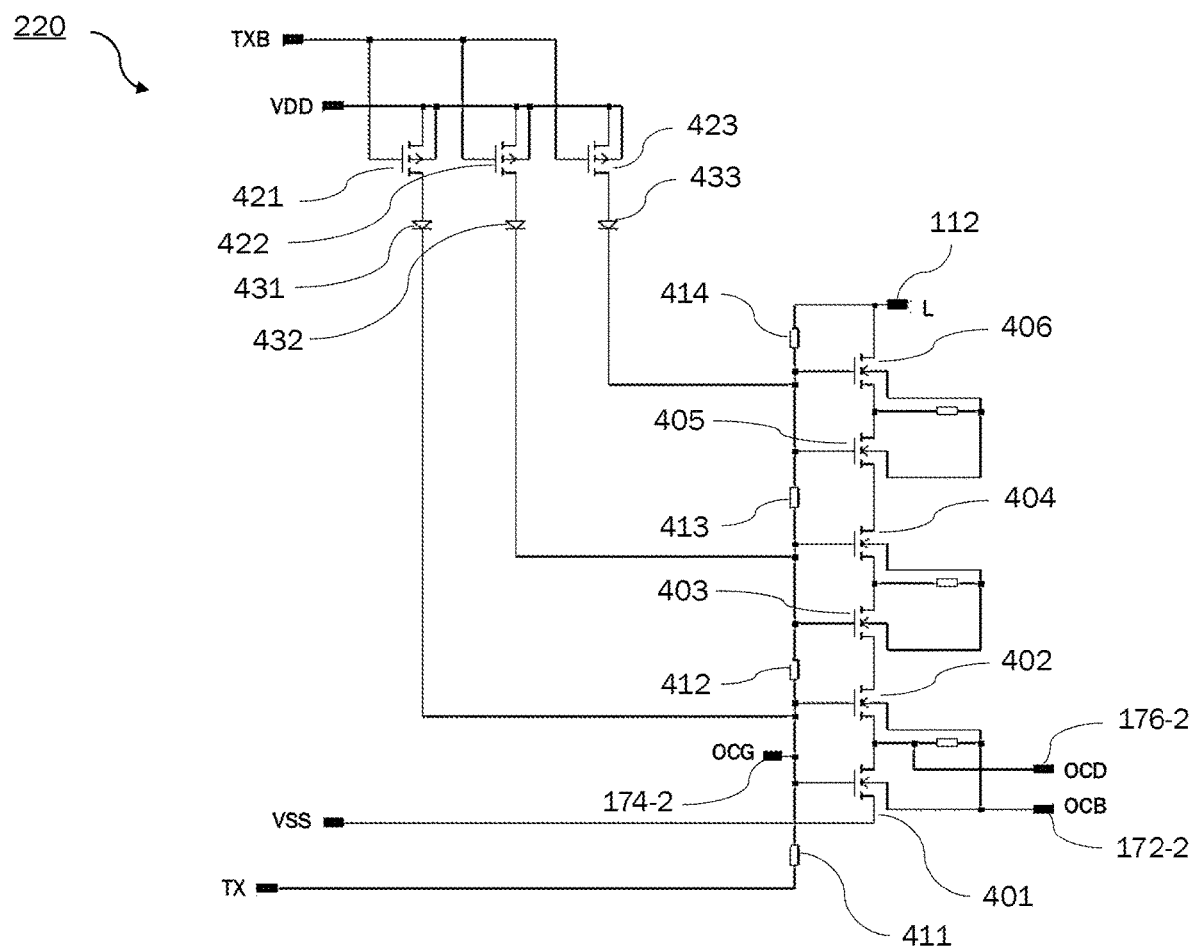

FIG. 3 and FIG. 4 schematically illustrate examples of the first and second bi-state driver circuits 210, 220, respectively. In the example of these figures, the first bi-state driver circuit 210 is a pull-up circuit and the second bi-state driver circuit 220 is a pull-down circuit. Accordingly, in these examples, the first predetermined voltage level is the supply voltage VDD, and the second predetermined voltage level is the ground voltage VSS. Further, in these examples, the first output terminal 111 is the H terminal, the second output terminal 112 is the L terminal, the first signal line 162-1 is the H line, and the second signal line 162-2 is the L-line. Unless indicated otherwise, the descriptions of the present disclosure are made in the context of this example. However, the present disclosure shall not be construed as being limited to this example, and also reverse assignments are understood to be comprised by the scope of the present disclosure.

As can be seen from FIG. 3, the first bi-state driver circuit 210 comprises the first output terminal 111 and a first string of one or more transistors 301-306 connected between the first output terminal 111 (the H terminal in the present example) and the first predetermined voltage level (the supply voltage VDD in the present example). The transistors 301-306 of the first string of transistors may be Field-Effect-Transistors (FETs), such as Metal-Oxide-Semiconductor-FETs (MOSFETs), for example. Further, the transistors 301-306 may be high-voltage tolerant (e.g. 16V) MOSFETs. If the first predetermined voltage level is the supply voltage, the transistors 301-306 may be PMOS transistors. Notably, the first bi-state driver circuit 210 does not comprise any protection diodes for preventing a reverse current flowing between the first output terminal 111 and the first predetermined voltage level. In FIG. 3, the first string of transistors comprises well-connected pairs of transistors (i.e. pairs of transistors with their well connection shared with the center connection). Arranging the transistors in such pairs prevents leakage through the pn-drain-well junction in forward-bias mode. However, the present disclosure is not limited to well-connected pairs of transistors, and each of these pairs may be replaced by a single transistor. Among the transistors 301-306 of the first string, there is a monitored transistor (first transistor) 301 (e.g. the transistor arranged closest to the first output terminal 111). The first bi-state driver circuit 210 may be adapted to detect respective voltages at the bulk terminal, gate terminal and drain terminal of the monitored transistor 301, and to output these voltages as respective voltage signals 172-1, 174-1, 176-1. As will be explained in more detail below, the transceiver 100 may comprise one or more detection transistors (second transistors) that are (scaled) replica of the monitored transistor 301, and to the terminals of which voltages matching those at respective terminals of the monitored transistor 301 are applied, using the voltage signals 172-1, 174-1, 176-1 output by the first bi-state driver circuit 210. Thereby, the operating state of the monitored transistor 310 can be replicated, and a current flowing through the monitored transistor 301 both in forward-bias mode and reverse-bias mode can be determined, i.e. a scaled version of this current can be determined.

The first bi-state driver circuit 210 may further comprise a string of resistors 311-314 connected between a voltage level of the second control signal TXB and the first output terminal 111. Gate terminals of the transistors 301-306 of the first string of transistors may be connected to the string of resistors, (e.g. to respective intermediate nodes between respective resistors of the string of resistors). Thereby, it is ensured that the threshold voltage in the reverse-bias condition is low enough to block any current through the transistors 301-306 of the first string of transistors. The first bi-state driver circuit 210 may further comprise a pre-driver circuit for switching (driving) the transistors 301-306 of the first string of transistors. Said pre-driver circuit may comprise one or more transistors 321, 322, 323 (e.g. NMOS transistors) connected between the second predetermined voltage level (the ground voltage VSS in the present example) and respective intermediate nodes. The number of the transistors of the pre-driver circuit may match the number of (pairs of) transistors in the first string of transistors. The first bi-state driver circuit 210 may further comprise diodes 331, 332, 333 respectively connected between the transistors of the pre-driver circuit and corresponding intermediate nodes. As mentioned above, the first bi-state driver circuit 210 does not comprise any diodes for blocking a reverse current in the first string of transistors. The transistors of the pre-driver circuit may be switched (driven) in accordance with the first control signal TX. Switching the transistors 321-323 of the pre-driver circuit to the (fully) conducting state results in switching the transistors 301-306 of the first string of transistor to the (fully) conducting state, and hence in connecting the first output terminal 111 to the first predetermined voltage level. On the other hand, if the transistors 321-323 of the pre-driver circuit are in the non-conducting state, also the transistors 301-306 of the first string of transistors are in the non-conducting state, and the first output terminal 111 presents a high impedance to the first signal line 162-1 (the H line in the present example).

The second bi-state driver circuit 220 is complementary to the first bi-state driver circuit 210, i.e. may be obtained from the first bi-state driver circuit 210 by replacing any PMOS by an NMOS, and vice versa, and by exchanging and the first and second control signals. Accordingly, as can be seen from FIG. 4, the second bi-state driver circuit 220 comprises the second output terminal 112 (the L terminal in the present example) and a second string of one or more transistors 401-406 connected between the second output terminal 112 and the second predetermined voltage level (the ground voltage VSS in the present example). The transistors 401-406 of the second string of transistors may be FETs, such as MOSFETs, for example. Further, the transistors 401-406 may be high-voltage tolerant (e.g. 16V) MOSFETs. If the second predetermined voltage level is the ground voltage, the transistors 401-406 may be NMOS transistors. Notably, the second bi-state driver circuit 220 does not comprise any protection diodes for preventing a reverse current flowing between the second predetermined voltage level and the second output terminal 112. In FIG. 4, the second string of transistors comprises well-connected pairs of transistors (i.e. pairs of transistors with their well connection shared with the center connection). However, the present disclosure is not limited to well-connected pairs of transistors, and each of these pairs may be replaced by a single transistor. Among the transistors 401-406 of the second string, there is a monitored transistor (third transistor) 401 (e.g. the transistor arranged closest to the second predetermined voltage level, i.e. farthest from the second output terminal 112). The second bi-state driver circuit 220 may be adapted to detect respective voltages at the bulk terminal, gate terminal and drain terminal of the monitored transistor 401, and to output these voltages as respective voltage signals 172-2, 174-2, 176-2. As will be explained in more detail below, the transceiver 100 may comprise one or more detection transistors (fourth transistors) that are (scaled) replica of the monitored transistor 401, and to the terminals of which voltages matching those at respective terminals of the monitored transistor 401 are applied, using the voltage signals 172-2, 174-2, 176-2 output by the second bi-state driver circuit 220. Thereby, the operating state of the monitored transistor 401 can be replicated, and a current flowing through the monitored transistor 401 both in forward-bias mode and reverse-bias mode can be determined, i.e. a scaled version of this current can be determined.

The second bi-state driver circuit 220 may further comprise a string of resistors 411-414 connected between a voltage level of the first control signal TX and the second output terminal 112. Gate terminals of the transistors 401-406 of the second string of transistors may be connected to the string of resistors (e.g. to respective intermediate nodes between respective resistors of the string of resistors). Thereby, it is ensured that the threshold voltage in reverse-bias condition is low enough to block any current through the transistors 401-406 of the second string of transistors. The second bi-state driver circuit 220 may further comprise a pre-driver circuit for switching (driving) the transistors 401-406 of the second string of transistors. Said pre-driver circuit may comprise one or more transistors 421, 422, 423 connected between the first predetermined voltage level (the supply voltage VDD in the present example) and respective intermediate nodes. The number of the transistors of the pre-driver circuit may match the number of (pairs of) transistors in the second string of transistors. The second bi-state driver circuit 220 may further comprise diodes 431, 432, 433 respectively connected between the transistors of the pre-driver circuit and corresponding intermediate nodes. As mentioned above, the second bi-state driver circuit 220 does not comprise any diodes for blocking a reverse current in the second string of transistors. The transistors 421-423 of the pre-driver circuit may be switched (driven) in accordance with the second control signal TXB. Switching the transistors 421-423 of the pre-driver circuit to the (fully) conducting state results in switching the transistors 401-406 of the second string of transistor to the (fully) conducting state, and hence in connecting the second output terminal 112 to the second predetermined voltage level. On the other hand, if the transistors 421-423 of the pre-driver circuit are in the non-conducting state, also the transistors 401-406 of the second string of transistors are in the non-conducting state, and the second output terminal 112 presents a high impedance to the second signal line 162-2 (the L line in the present example).

The general concept of the present disclosure will now be described with reference to FIG. 12, which is a flow chart illustrating an example of a method of operating the transceiver 100 according to embodiments of the disclosure. While the described example of the method makes reference to e.g. the (first) output terminal 111 and the first transistor 301, it may likewise relate to e.g. the second output terminal 112 and the third transistor 401, with obvious modifications. In other words, the method illustrated in FIG. 12 may be applied to both the H terminal as the output terminal and the L terminal as the output terminal.

At step S1201 (detection step), a first quantity depending on a current flowing through the first transistor 301 is detected (determined). For example, The first quantity may be said current itself, may be proportional to said current, may be a voltage proportional to said current, or may be a current or voltage proportional to a sum or difference involving said current. Examples of the first quantity will be provided below. The first quantity may be detected during the active state of the transceiver 100. Said detection of the first quantity may be performed by a current detector (current detection circuit) of the transceiver 100.

At step S1202 (failure determination step), it is determined whether the detected first quantity satisfies at least one error condition (failure condition). Examples of error conditions will be described below. Said determination of whether the detected first quantity satisfies at least one error condition may be performed by a failure detection circuit of the transceiver 100.

The method proceeds to step S1204 if the first quantity satisfies at least one error condition (Yes at step S1203), and otherwise returns to step S1201 (No at step S1203).

At step S1204 (control step), it is concluded that a fault is present, e.g. in the differential signaling bus, and the transceiver 100 is switched (returned) to the inactive (recessive) state in order to protect the transceiver 100 from damage, regardless of the transmission signal TXD. This step may be performed by the control circuit 130, which is connected to the bus-driver circuit 110 and which may control the bus-driver circuit 110. For example, the bus-driver circuit 110 may be switched to the inactive state.

Returning to FIG. 1, the transceiver 100 may comprise one or more fault detection circuits (fault detection blocks) 142-1, 142-2, 144-1, 144-2, 146-1, 146-2, 148, 152-1, 152-2, 154-1, 154-2, 156. For example the transceiver 100 may comprise up to two first fault detection circuits (over-current detection circuits in reverse-bias mode) 142-1, 142-2 for detecting an over-current in a reverse-bias direction on the first and second signal lines 162-1, 162-2, respectively. For the H line (exemplarily embodying the first signal line 162-1 in the present example), the reverse-bias condition corresponds to the case V(H)>VDD, and for the L line (exemplarily embodying the second signal line 162-2 in the present example) the reverse-bias condition corresponds to the case V(L)<VSS, V(H) and V(L) being the voltage levels at the H terminal and the L terminal, respectively. Since the transceiver 100 does not comprise protection diodes at the H terminal (exemplarily embodying the first output terminal 111 in the present example) and the L terminal (exemplarily embodying the second output terminal 112 in the present example), short circuit faults of the differential signaling bus would result in large currents flowing into the VDD and VSS voltage levels, respectively. In order to avoid this situation, excessive reverse currents are detected by the first fault detection circuits 142-1, 142-2, and the bus-driver circuit 110 of the transceiver 100 is switched off (i.e. the transceiver 100 is returned to the inactive state) in such case. The one or more fault detection circuits 142-1, 142-2, 144-1, 144-2, 146-1, 146-2, 148, 152-1, 152-2, 154-1, 154-2, 156 may each raise respective error flags described in more detail below. These error flags may be supplied to the control circuit 130 (not explicitly shown in FIG. 1).

Figure 6:
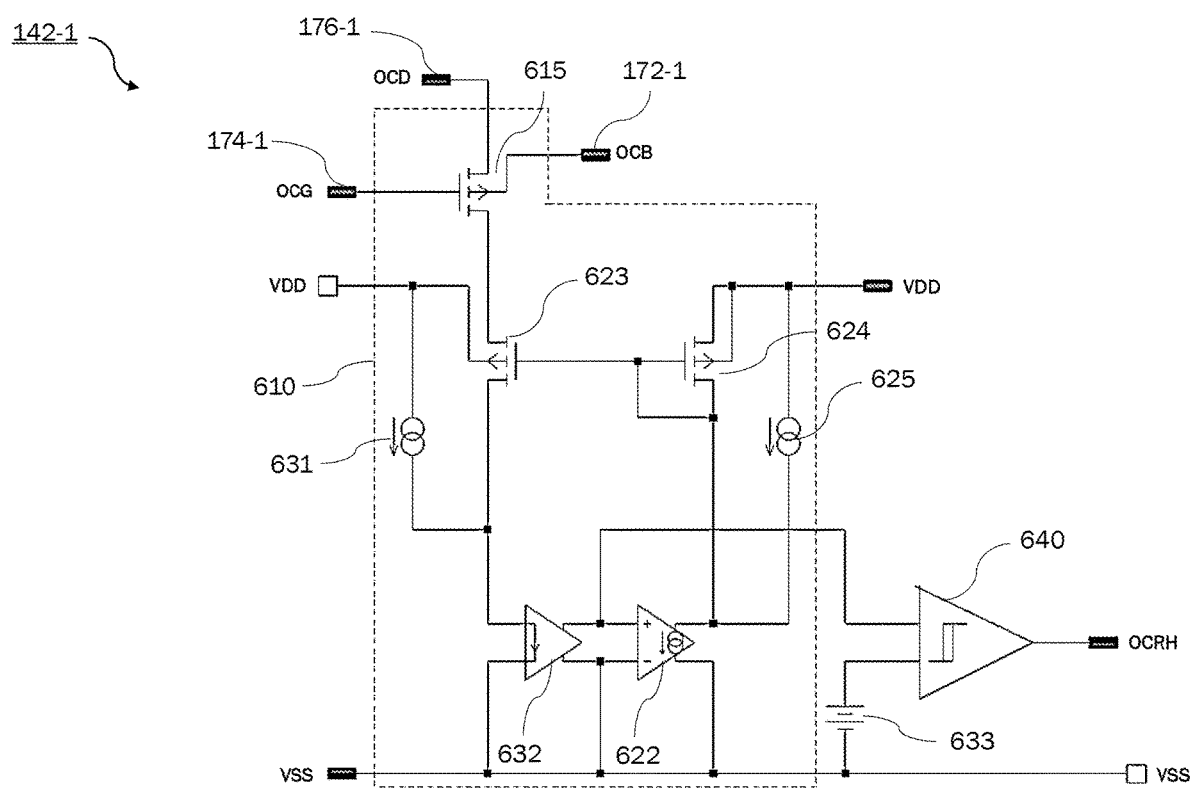

FIG. 6 schematically illustrates an example of the first fault detection circuit (over-current detection circuit in reverse-bias mode) 142-1 for the H line. The first fault detection circuit 142-1 for the H line receives the voltage signals 172-1, 174-1, 176-1 that are indicative of, respectively, the voltages at the bulk terminal, the gate terminal, and the drain terminal of the first transistor (monitored transistor associated with the H line) 301. The first fault detection circuit 142-1 for the H line comprises a first current detection sub-circuit 610 for detecting a second quantity that depends on (is indicative of) the current flowing through the first transistor 301, and a first comparator 640 for comparing the second quantity to a first threshold value. The first current detection sub-circuit 610 is adapted to detect the second quantity in reverse-bias mode, i.e. if the voltage V(H) at the H terminal exceeds the supply voltage VDD (exemplarily embodying the first predetermined voltage level in the present example). The second quantity is an example (implementation) of the first quantity. The first threshold value may be supplied e.g. by a voltage source 633 outputting a predetermined voltage as the first threshold value. The first fault detection circuit 142-1 for the H line is adapted to raise a first error flag OCRH if the second quantity exceeds the first threshold value. This error flag indicates an over-current in reverse-bias mode at the H terminal. Further, this error flag may correspond to the output of the first comparator 640. The second quantity exceeding the first threshold value is an example of an error condition of the first quantity.

The first current detection sub-circuit 610 may comprise a second transistor (detection transistor associated with the H line) 615 that is a scaled replica of the first transistor (monitored transistor associated with the H line) 301. The first current detection sub-circuit 610 receives the voltage signals 172-1, 174-1, 176-1 that are indicative of, respectively, the voltages at the bulk terminal, the gate terminal, and the drain terminal of the first transistor 301, and is adapted to apply respective voltages to corresponding terminals of the second transistor 615. In reverse-bias mode, the voltage V(H) at the H terminal exceeds the supply voltage VDD, so that a current flows from the drain terminal of the second transistor 615 to its source terminal which is set at the supply voltage level VDD. The current that passes through the second transistor 615 flows through a cascode-connected transistor 623, whose gate terminal is set such that its source terminal substantially remains at the supply voltage level. The voltage at the gate terminal of the cascode-connected transistor 623 is generated by providing a transistor 624 that is a copy (replica) of the cascode-connected transistor 623. The transistor 624 is connected between the supply voltage level VDD and a voltage level that is set by the output of a feedback loop which includes an operational amplifier 622. Gate terminals of the transistor 624 and the cascode-connected transistor 623 are connected to each other. Further, the gate and drain terminals of the transistor 624 are connected to each other. Thus, the cascode-connected transistor 623 and the transistor 624 may be said to form a current mirror. Eventually, the current flowing through the second transistor 615 may be converted to a voltage by a current-voltage converter 632 for comparison to the first threshold value at the first comparator 640. Alternatively, the first fault detection circuit 142-1 for the H line may comprise circuitry for comparing the current flowing through the second transistor 615 to a threshold current. The first current detection sub-circuit 610 may further comprise current sources 631, 625 respectively connected between source and drain terminals of the cascode-connected transistor 623 and the transistor 624.

Figure 12:
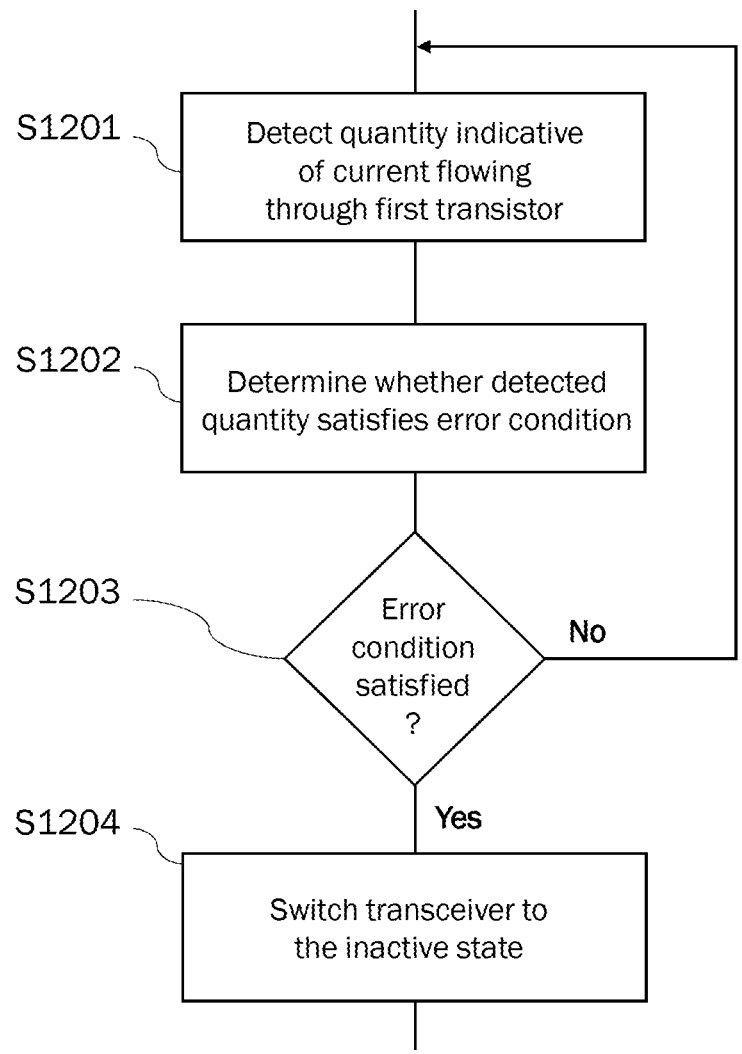
FIG. 12 is a flow chart schematically illustrating an example of a method for operating a transceiver according to embodiments of the disclosure.

Accordingly, if the transceiver 100 comprises the first fault detection circuit 142-1 for the first output terminal 111 (i.e. if the first output terminal 111 is the H terminal), the detection step S1201 in FIG. 12 may involve detecting a second quantity indicative of a current flowing through the first transistor 301 in a first direction (e.g. the reverse-bias direction). As indicated above, the second quantity may be an example (implementation) of the first quantity. The second quantity may be indicative of the current flowing through the second transistor 615 (which is a scaled replica of the first transistor 301, and to the terminals of which the same voltages as present at the terminals of the first transistor 301 are applied). The failure determination step S1202 may involve comparing the detected second quantity to a first threshold, and determining that the first quantity satisfies an error condition if the detected second quantity exceeds the first threshold. Notably, these steps may also be applied to the L terminal, with obvious modifications.

In accordance with the above, the current detector of the transceiver 100 may comprise the second transistor (detection transistor) 615, and circuitry for applying the same voltages to the terminals of the second transistor 615 as present at the terminals of the first transistor (monitored transistor) 301. In other words, the current detector may comprise the first current detection sub-circuit 610 of the first fault detection circuit 142-1 for the H line. Accordingly, the current detector may be adapted to detect said second quantity. Further, the failure determination circuit of the transceiver 100 may comprise the comparator 640 of the first fault detection circuit 142-1 for the H line and may be configured to output the first error flag for the H line (OCRH). The second quantity exceeding the first threshold value is an example of an error condition of the first quantity.

Figure 8:
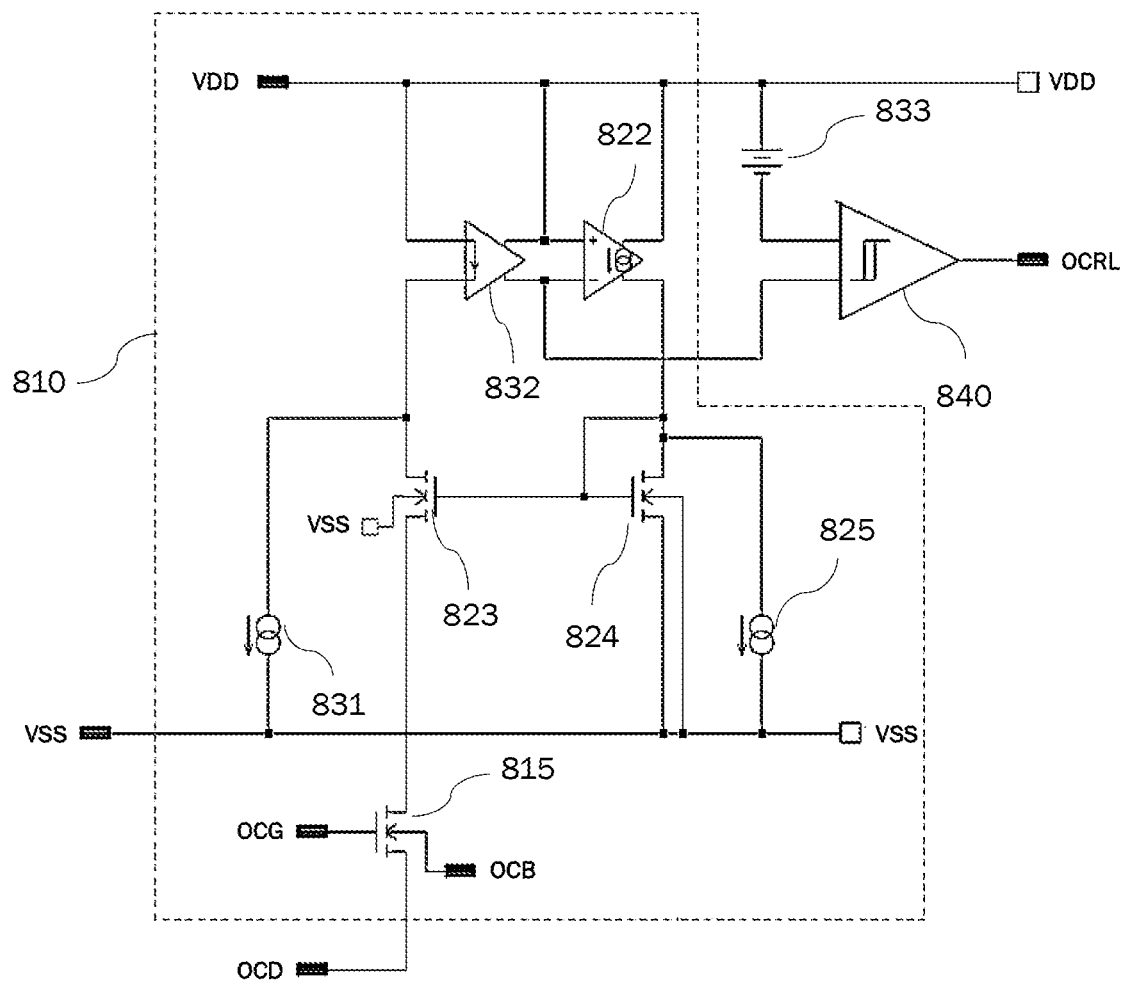

FIG. 6 relates to the case that the second quantity is detected with respect to the H line. Alternatively, or in addition, the second quantity may be detected for the L line. FIG. 8 schematically illustrates an example of the first fault detection circuit 142-2 for the L line. The first fault detection circuit 142-2 for the L line is identical to the first fault detection circuit 142-1 for the H line illustrated in FIG. 6, except for that PMOS and NMOS transistors are interchanged, the roles of the supply voltage level and ground are exchanged, and the currents flow in opposite direction. Further, instead of voltage signals 172-1, 174-1, 176-1 indicative of voltage levels at the terminals of the first transistor 301, now voltage signals 172-2, 174-2, 176-2 indicative of voltage levels at the terminals of the third transistor (monitored transistor associated with the L line) 401 are provided to the first fault detection circuit 142-2 for the L line. Otherwise, the same considerations as with regard to the first fault detection circuit 142-1 for the H line (see FIG. 6) apply, with obvious modifications.

Thus, the first fault detection circuit 142-2 for the L line comprises a first current detection sub-circuit 810 for detecting a second quantity depending on the current flowing through the third transistor 401, and a first comparator 840 for comparing the second quantity to a first threshold value. The first current detection sub-circuit 810 is adapted to detect the second quantity in reverse-bias mode, i.e. if the voltage V(L) at the L terminal does not exceed the ground voltage. The first threshold value may be supplied e.g. by a voltage source 833 outputting a predetermined voltage as the first threshold value. The first fault detection circuit 142-2 for the L line is adapted to raise a first error flag OCRL if the second quantity exceeds the first threshold value. This error flag indicates an over-current in reverse-bias mode at the L terminal. Further, this error flag may correspond to the output of the first comparator 840.

The first current detection sub-circuit 810 may comprise a fourth transistor (detection transistor associated with the L line) 815 that is a scaled replica of the third transistor (monitored transistor associated with the L line) 401. The first current detection sub-circuit 810 receives the voltage signals 172-2, 174-2, 176-2 that are indicative of, respectively, the voltages at the bulk terminal, the gate terminal, and the drain terminal of the third transistor 401, and is adapted to apply respective voltages to corresponding terminals of the fourth transistor 815. In reverse-bias mode, the voltage V(L) at the L terminal is below the ground voltage, so that a current flows from the source terminal of the fourth transistor 815 to its drain terminal which is set at the ground voltage level. The current that passes through the fourth transistor 815 flows through a cascode-connected transistor 823, whose gate terminal is set such that its source terminal substantially remains at the ground voltage level. The voltage at the gate terminal of the cascode-connected transistor 823 is generated by providing a transistor 824 that is a copy (replica) of the cascode-connected transistor 823. The transistor 824 is connected between the ground voltage level VSS and a voltage level that is set by the output of a feedback loop which includes an operational amplifier 822. Gate terminals of the transistor 824 and the cascode-connected transistor 823 are connected to each other. Further, the gate and drain terminals of the transistor 824 are connected to each other. Thus, the cascode-connected transistor 823 and the transistor 824 may be said to form a current mirror. Eventually, the current flowing through the fourth transistor 815 may be converted to a voltage by a current-voltage converter 832 for comparison to the first threshold value at the first comparator 840. Alternatively, the first fault detection circuit 142-2 for the L line may comprise circuitry for comparing the current flowing through the fourth transistor 815 to a threshold current. The first current detection sub-circuit 810 may further comprise current sources 831, 825 respectively connected between source and drain terminals of the cascode-connected transistor 823 and the transistor 824.

If both first fault detection circuits 142-1, 142-2 are provided, the second quantity may be detected and monitored (i.e. compared to respective first thresholds) for both the H line and the L line. In this case, the current detector of the transceiver 100 may further comprise the fourth transistor (detection transistor associated with the L line) 815, and circuitry for applying the same voltages to the terminals of the fourth transistor 815 as present at the terminals of the third transistor (monitored transistor associated with the L line) 401. In other words, the current detector may additionally comprise the first current detection sub-circuit 810 of the first fault detection circuit 142-2 for the L line. Further, the failure determination circuit of the transceiver 100 may additionally comprise the comparator 840 of the first fault detection circuit 142-2 for the L line and may be configured to output the first error flag for the L line (OCRL).

Returning to FIG. 1, the transceiver 100 may further comprise up to two second fault detection circuits (over-current detection circuits in forward-bias mode) 144-1, 144-2 for detecting an over-current in a forward-bias direction on the first and second signal lines 162-1, 162-2, respectively. For the H line (exemplarily embodying the first signal line 162-1 in the present example), the forward-bias condition corresponds to the case V(H)<VDD, and for the L line (exemplarily embodying the second signal line 162-2 in the present example) the forward-bias condition corresponds to the case V(L)>VSS. Once the bus-driver circuit 110 is in the dominant state and a large current is passing through the bus-driver circuit 110, the second fault detection circuits 144-1, 144-2 detect conditions under which the driver bus current (in forward-bias mode) could increase beyond acceptable levels so that the bus-driver circuit 110 should be switched off and the transceiver 100 should be returned back to the recessive state. Such currents beyond acceptable levels may result from short circuit faults of the differential signaling bus on the H line and/or L line.

Figure 5:
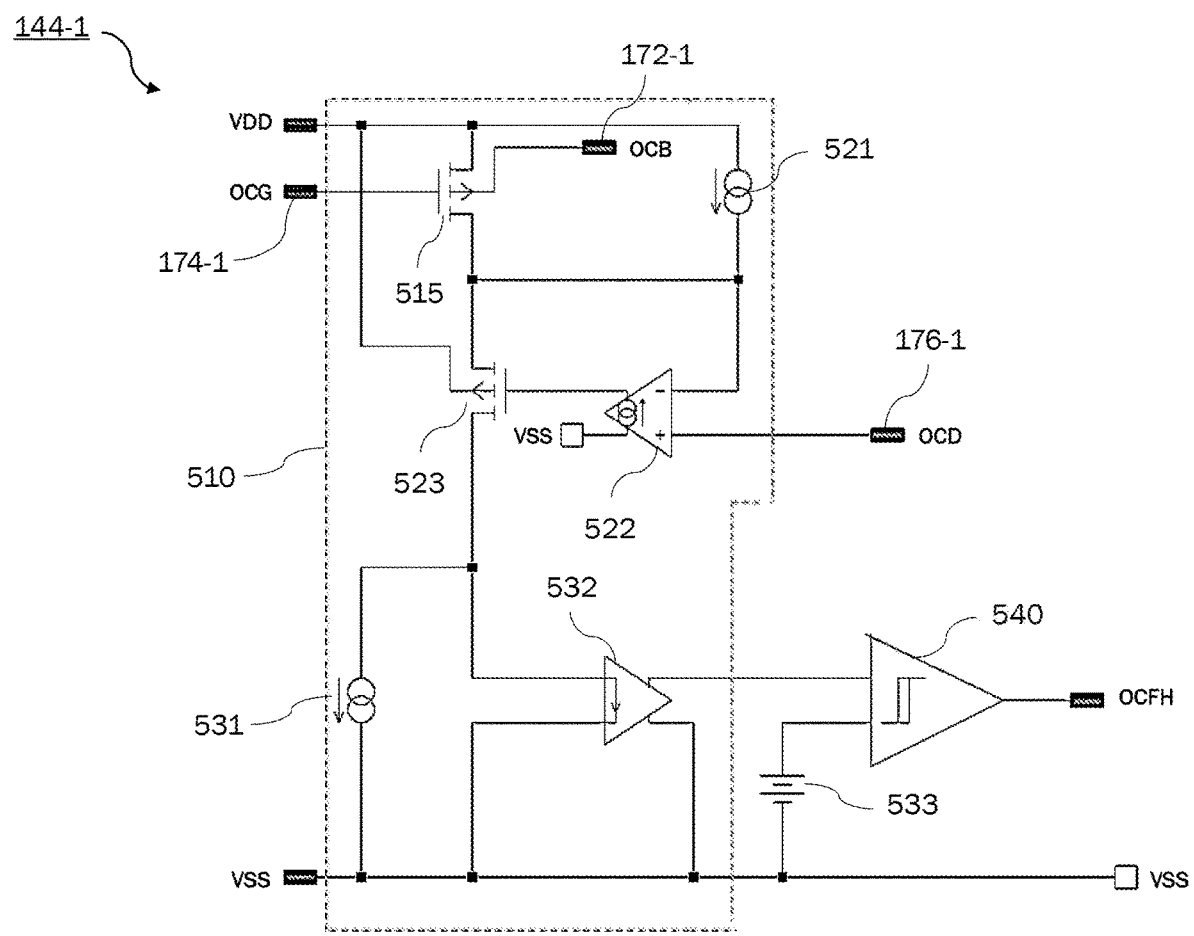
FIG. 5 through FIG. 11 schematically illustrate examples of fault detection blocks of the transceiver of FIG. 1.

FIG. 5 schematically illustrates an example of the second fault detection circuit (over-current detection circuit in forward-bias mode) 144-1 for the H line. The second fault detection circuit 144-1 for the H line receives the voltage signals 172-1, 174-1, 176-1 that are indicative of respectively, the voltages at the bulk terminal, the gate terminal, and the drain terminal of the first transistor (monitored transistor associated with the H line) 301. The second fault detection circuit 144-1 for the H line comprises a second current detection sub-circuit 510 for detecting a third quantity that depends on (is indicative of) the current flowing through the first transistor 301, and a second comparator 540 for comparing the third quantity to a second threshold value. The second current detection sub-circuit 510 is adapted to detect the third quantity in forward-bias mode, i.e. if the voltage V(H) at the H terminal is below the supply voltage VDD (exemplarily embodying the first predetermined voltage level in the present example). The third quantity is an example (implementation) of the first quantity. The second threshold value may be supplied e.g. by a voltage source 533 outputting a predetermined voltage as the second threshold value. The second fault detection circuit 144-1 for the H line is adapted to raise a second error flag OCFH if the third quantity exceeds the second threshold value. This error flag indicates an over-current in forward-bias mode at the H terminal. Further, this error flag may correspond to the output of the second comparator 540. The third quantity exceeding the second threshold value is an example of an error condition of the first quantity.

The second current detection sub-circuit 510 may comprise a second transistor (detection transistor associated with the H line) 515 that is a scaled replica of the first transistor (monitored transistor associated with the H line) 301. The second current detection sub-circuit 510 receives the voltage signals 172-1, 174-1, 176-1 that are indicative of, respectively, the voltages at the well terminal, the gate terminal, and the drain terminal of the first transistor 301, and is adapted to apply respective voltages to corresponding terminals of the second transistor 515. The voltage level at the drain terminal of the second transistor 515 is dynamically adjusted with the aid of a cascode-connected transistor 523, the gate voltage of which is controlled by means of an operational amplifier 522 that receives the voltage signal 176-1 indicative of the voltage at the drain terminal of the first transistor 301 at one of its input ports. The current passing through the cascode-connected transistor 523 may be increased by means of a current source 531, thereby ensuring fast response to a variation in the driver current. The current that passes through the second transistor 515 flows through the cascode-connected transistor 523, and may be converted to a voltage by a current-voltage converter 532 for comparison to the second threshold value at the second comparator 540. Alternatively, the second fault detection circuit 144-1 for the H line may comprise circuitry for comparing the current flowing through the second transistor 515 to a threshold current. The second current detection sub-circuit 510 may further comprise a current source 521 connected between the source and drain terminals of the second transistor 515, and the current source 531 connected across input ports of the current-voltage converter 532.

Accordingly, if the transceiver 100 comprises the second fault detection circuit 144-1 for the first output terminal 111 (i.e. if the first output terminal is the H terminal), the detection step S1201 in FIG. 12 may involve detecting a third quantity indicative of a current flowing through the first transistor 301 in a second direction (opposite to the first direction, e.g. the forward-bias direction). As indicated above, the third quantity may be an example (implementation) of the first quantity. The third quantity may be indicative of the current flowing through the second transistor 515 (which is a scaled replica of the first transistor 301, and to the terminals of which the same voltages as present at the terminals of the first transistor 301 are applied). The failure determination step S1202 may involve comparing the detected third quantity to a second threshold, and determining that the first quantity satisfies an error condition if the detected third quantity exceeds the second threshold. Notably, these steps may also be applied to the L terminal, with obvious modifications.

In accordance with the above, the current detector of the transceiver 100 may comprise the second transistor (detection transistor) 515, and circuitry for applying the same voltages to the terminals of the second transistor 515 as present at the terminals of the first transistor (monitored transistor) 301. In other words, the current detector may comprise the second current detection sub-circuit 510 of the second fault detection circuit 144-1 for the H line. Accordingly, the current detector may be adapted to detect said third quantity. Further, the failure determination circuit of the transceiver 100 may comprise the comparator 540 of the second fault detection circuit 144-1 for the H line and may be configured to output the second error flag for the H line (OCFH).

Figure 7:
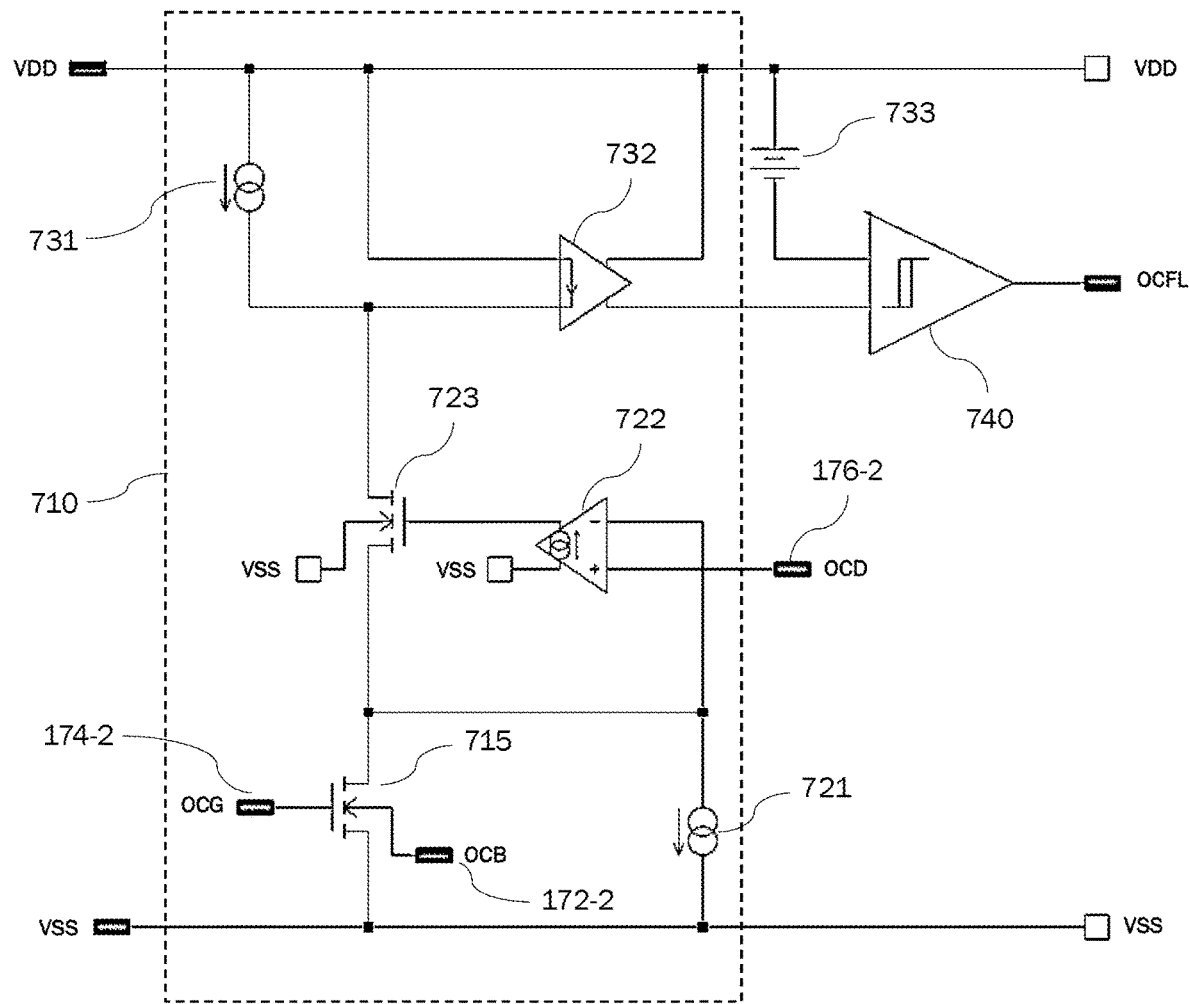

FIG. 5 relates to the case that the third quantity is detected with respect to the H line. Alternatively, or in addition, the third quantity may be detected for the L line. FIG. 7 schematically illustrates an example of the second fault detection circuit 144-2 for the L line. The second fault detection circuit 144-2 for the L line is identical to the second fault detection circuit 144-1 for the H line illustrated in FIG. 5, except for that PMOS and NMOS transistors are interchanged, the roles of the supply voltage level and ground are exchanged, and the currents flow in opposite direction. Further, instead of voltage signals 172-1, 174-1, 176-1 indicative of voltage levels at the terminals of the first transistor 301, now voltage signals 172-2, 174-2, 176-2 indicative of voltage levels at the terminals of the third transistor (monitored transistor associated with the L line) 401 are provided to the second fault detection circuit 144-2 for the L line. Otherwise, the same considerations as with regard to the second fault detection circuit 144-1 for the H line (see FIG. 5) apply, with obvious modifications.

Thus, the second fault detection circuit 144-2 for the L line comprises a second current detection sub-circuit 710 for detecting a third quantity depending on the current flowing through the third transistor 401, and a second comparator 740 for comparing the third quantity to a second threshold value. The second current detection sub-circuit 710 is adapted to detect the third quantity in forward-bias mode, i.e. if the voltage V(L) at the L terminal exceeds the ground voltage VSS. The second threshold value may be supplied e.g. by a voltage source 733 outputting a predetermined voltage as the second threshold value. The second fault detection circuit 144-2 for the L line is adapted to raise a second error flag OCFL if the third quantity exceeds the second threshold value. This error flag indicates an over-current in forward-bias mode at the L terminal. Further, this error flag may correspond to the output of the second comparator 740. The third quantity exceeding the second threshold value is an example of an error condition of the first quantity.

The second current detection sub-circuit 710 may comprise a fourth transistor (detection transistor associated with the L line) 715 that is a scaled replica of the third transistor (monitored transistor associated with the L line) 401. The second current detection sub-circuit 710 receives the voltage signals 172-2, 174-2, 176-2 that are indicative of, respectively, the voltages at the bulk/well terminal, the gate terminal, and the drain terminal of the third transistor 401, and is adapted to apply respective voltages to corresponding terminals of the fourth transistor 715. The voltage level at the drain terminal of the fourth transistor 715 is dynamically adjusted with the aid of a cascode-connected transistor 723, the gate voltage of which is controlled by means of an operational amplifier 722 that receives the voltage signal 176-2 indicative of the voltage at the drain terminal of the third transistor 401 at one of its input ports. The current passing through the cascode-connected transistor 723 may be increased by means of a current source 721, thereby ensuring fast response to a variation in the driver current. The current that passes through the fourth transistor 715 flows through the cascode-connected transistor 723, and may be converted to a voltage by a current-voltage converter 732 for comparison to the second threshold value at the second comparator 740. Alternatively, the second fault detection circuit 144-2 for the L line may comprise circuitry for comparing the current flowing through the fourth transistor 715 to a threshold current. The second current detection sub-circuit 710 may further comprise a current source 721 connected between the source and drain terminals of the fourth transistor 715, and the current source 731 connected across input ports of the current-voltage converter 732.

If both second fault detection circuits 144-1, 144-2 are provided, the third quantity may be detected and monitored (i.e. compared to respective second thresholds) for both the H line and the L line. In this case, the current detector of the transceiver 100 may further comprise the fourth transistor (detection transistor associated with the L line) 715, and circuitry for applying the same voltages to the terminals of the fourth transistor 715 as present at the terminals of the third transistor (monitored transistor associated with the L line) 401. In other words, the current detector may additionally comprise the second current detection sub-circuit 710 of the second fault detection circuit 144-2 for the L line. Further, the failure determination circuit of the transceiver 100 may additionally comprise the comparator 740 of the second fault detection circuit 144-2 for the L line and may be configured to output the second error flag for the L line (OCFL).

With the above fault detection circuits (detectors) the bus-driver circuit 110 (driver) will be protected in the dominant state against excessive currents that could impair or compromise its lifetime of operation. The same circuits operating with the driver in dominant state can also be used to probe the state of the bus. Single and double open H and L port bus connections can be detected as well as single and double shorts.

Returning to FIG. 1, the transceiver 100 may further comprise up to two third fault detection circuits (sampling under-current detection circuits) 146-1, 146-2 for detecting an undercurrent in a forward-bias direction on the first and second signal lines 162-1, 162-2, respectively. The third fault detection circuits 146-1, 146-2 sample the current through the respective H and L ports in the active (i.e. dominant) state of the transceiver 100, and compare the sampled currents to a minimum expected value. Sampled values below this threshold are indicative of a disconnection of the respective port. Accordingly, single and double open H and L bus port connections, as well as single and double short circuit faults can be detected by the third fault detection circuits 146-1, 146-2. As a measure of safety, the bus-driver circuit 110 of the transceiver 100 may be switched off (i.e. the transceiver 100 may be returned to the inactive state) in such cases.

Figure 9:
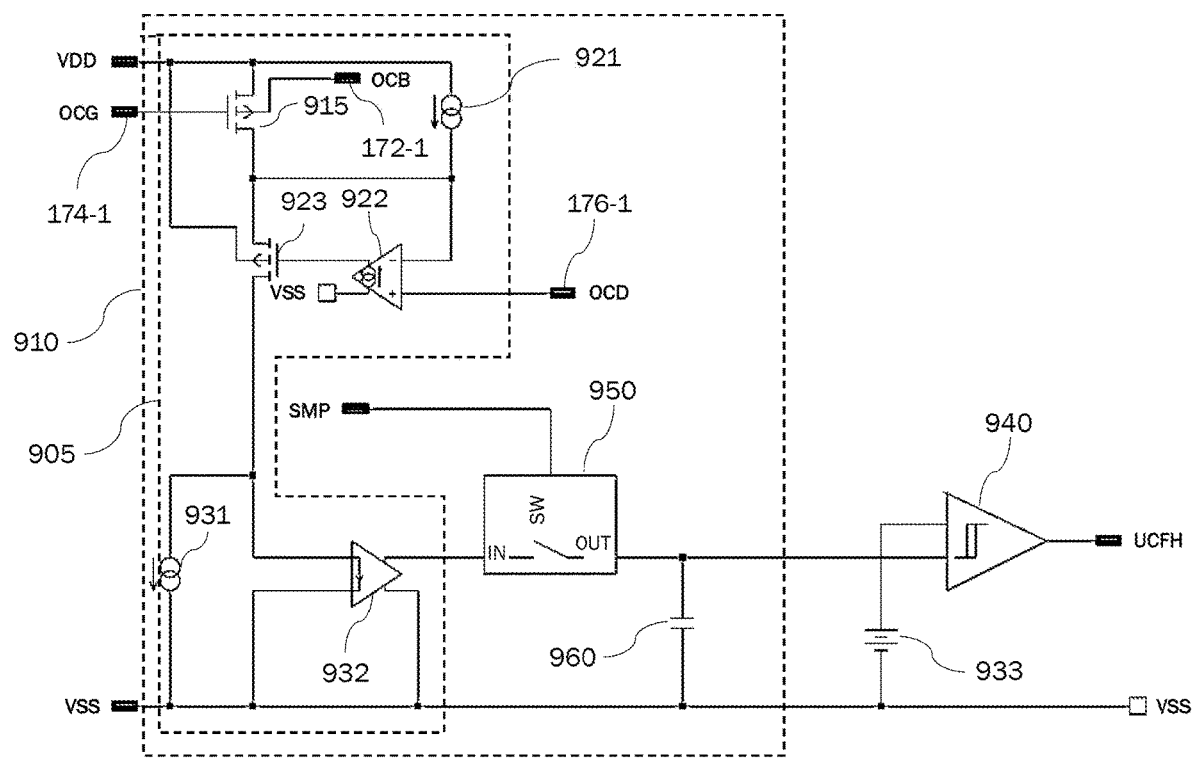

FIG. 9 schematically illustrates an example of the third fault detection circuit (sampling under-current detection circuit) 146-1 for the H line. Broadly speaking, the third fault detection circuit 146-1 for the H line is identical to the second fault detection circuit 144-1 for the H line, with the difference that the detected current is sampled in voltage form and compared to a minimum threshold. The sampling timings for the current measurements should be provided after the current in the H terminal and H line have settled. This is the case at the end (or towards the end) of the dominant period of the transceiver 100. In general, the sampling timings may be said to be chosen such that the current in the respective line of the differential signaling bus has settled. Currents corresponding to sampled voltages below the minimum threshold indicate that the full port current is not flowing and, consequently, that an open circuit is connected to the respective port.

The third fault detection circuit 146-1 for the H line receives the voltage signals 172-1, 174-1, 176-1 that are indicative of, respectively, the voltages at the bulk terminal, the gate terminal, and the drain terminal of the first transistor (monitored transistor associated with the H line) 301. The third fault detection circuit 146-1 for the H line comprises a third current detection sub-circuit 910 for detecting a fourth quantity that depends on (is indicative of) an integrated value of sample values of respective currents flowing through the first transistor 301. The third current detection sub-circuit 910 may obtain (sample) the sample values towards respective ends of periods in a sequence of periods in which the transceiver 100 is in the active state. The third fault detection circuit 146-1 for the H line may further comprise a third comparator 940 for comparing the fourth quantity to a third threshold value. The third current detection sub-circuit 910 is adapted to detect the fourth quantity in forward-bias mode. The fourth quantity is an example (implementation) of the first quantity. The third threshold value may be supplied e.g. by a voltage source 933 outputting a predetermined voltage as the third threshold value. The third fault detection circuit 146-1 for the H line is adapted to raise a third error flag UCFH if the fourth quantity does not exceed the third threshold value. This error flag indicates an under-current (in forward-bias mode) at the H terminal. Further, this error flag may correspond to the output of the third comparator 940. The fourth quantity not exceeding the third threshold value is an example of an error condition of the first quantity.

The third current detection sub-circuit 910 comprises a sub-circuit 905, the configuration and function of which corresponds to that of the second current detection sub-circuit 510 of the second fault detection circuit 144-1 for the H line illustrated in FIG. 5. Accordingly, the sub-circuit 905 comprises a second transistor (detection transistor associated with the H line) 915 that is a scaled replica of the first transistor (monitored transistor associated with the H line) 301. The sub-circuit 905 receives the voltage signals 172-1, 174-1, 176-1 that are indicative of, respectively, the voltages at the bulk terminal, the gate terminal, and the drain terminal of the first transistor 301, and is adapted to apply respective voltages to corresponding terminals of the second transistor 915. The sub-circuit 905 further comprises a cascode-connected transistor 923, an operational amplifier 922, a current-voltage converter 932, and current sources 921, 931. For further details pertaining to the sub circuit 905 of the third current detection sub-circuit 910, reference is made to the description of the second current detection sub-circuit 510, which is directly applicable to said sub-circuit 905 of the third current detection sub-circuit 910.

The current detection sub-circuit 910 comprises, in addition to the sub-circuit 905, switching means (e.g. a controllable switch) 950 and a capacitor 960. The sub-circuit 905 outputs a voltage depending on a current flowing through the second transistor 915. The switching means 950, under control of a sampling signal SMP that indicates the sampling timings, intermittently charges the capacitor 960, i.e. charges the capacitor 960 with the voltage output by the sub-circuit 905 at sampling timings indicated by the sampling signal SMP. As indicated above, these sampling timings are timings towards respective ends of dominant periods of the transceiver 100, or in more general terms, timings at which the current in the respective line of the differential signaling bus has already settled and is not subject to (significant) fluctuations that would otherwise interfere with the measurement.

If the transceiver 100 comprises the third fault detection circuit 146-1 for the first output terminal 111 (i.e. if the first output terminal is the H terminal), the detection step S1201 in FIG. 12 may involve detecting a fourth quantity indicative of an integrated value of sample values of respective currents flowing through the first transistor 301. The sample values may be obtained (sampled) at timings towards respective ends of periods in a sequence of periods in which the transceiver 100 is in the active state. Detecting the fourth quantity may involve intermittently charging a capacitor at said timings by a voltage derived from a current flowing through the second transistor 915. As indicated above, the fourth quantity may be an example (implementation) of the first quantity. The failure determination step S1202 may involve comparing the detected fourth quantity to a third threshold, and determining that the first quantity satisfies an error condition if the detected fourth quantity does not exceed the third threshold. Notably, these steps may also be applied to the L terminal, with obvious modifications.

In accordance with the above, the current detector of the transceiver 100 may comprise the second transistor (detection transistor) 915, and circuitry for applying the same voltages to the terminals of the second transistor 915 as present at the terminals of the first transistor (monitored transistor) 301. In other words, the current detector may comprise the third current detection sub-circuit 910 of the third fault detection circuit 146-1 for the H line. Accordingly, the current detector may be adapted to detect said fourth quantity. In particular, the current detector may be adapted to detect the fourth quantity by intermittently charging the capacitor 960 at sampling timings e.g. towards respective ends of periods in which the transceiver 100 is in the dominant state, by a voltage derived from the current flowing through the second transistor 915. The fourth quantity may be indicative of a voltage across the capacitor 960. Further, the failure determination circuit of the transceiver 100 may comprise the comparator 940 of the third fault detection circuit 146-1 for the H line and may be configured to output the third error flag for the H line (UCFH).

Figure 10:
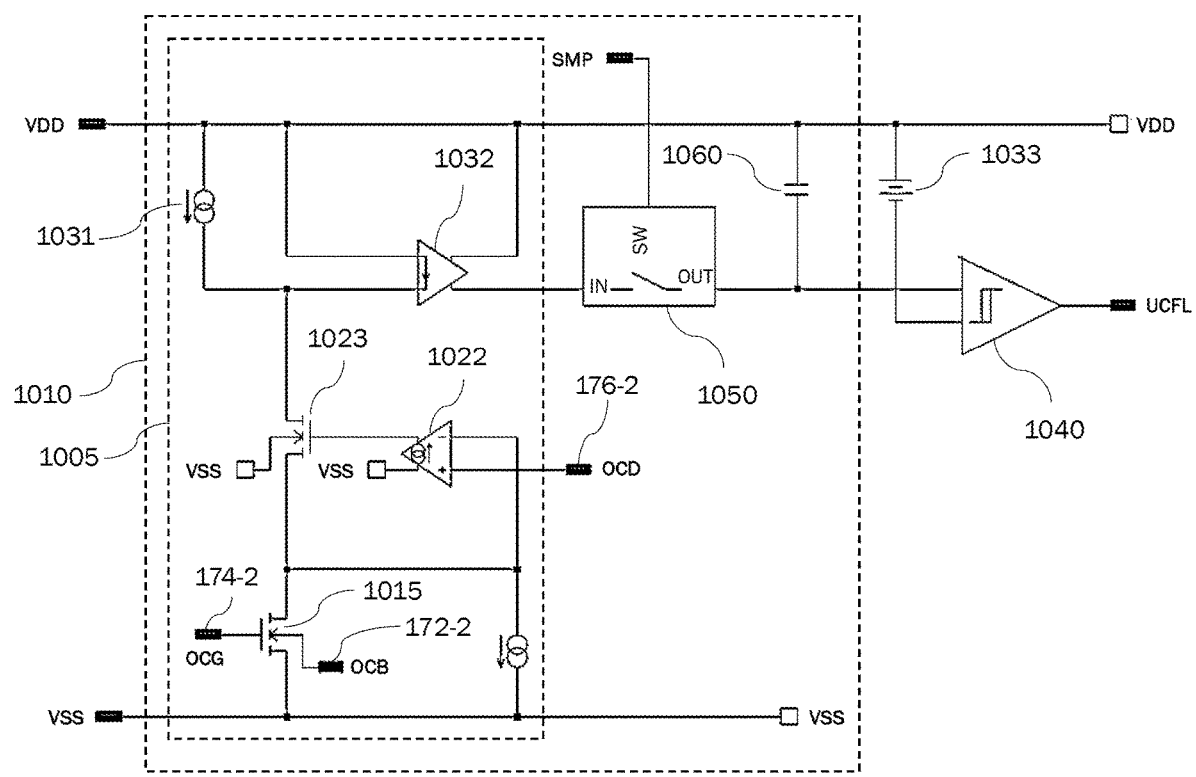

FIG. 9 relates to the case that the fourth quantity is detected with respect to the H line. Alternatively, or in addition, the fourth quantity may be detected for the L line. FIG. 10 schematically illustrates an example of the third fault detection circuit 146-2 for the L line. The third fault detection circuit 146-2 for the L line is identical to the third fault detection circuit 146-1 for the H line illustrated in FIG. 9, except for that PMOS and NMOS transistors are interchanged, the roles of the supply voltage level and ground are exchanged, and the currents flow in opposite direction. Further, instead of voltage signals 172-1, 174-1, 176-1 indicative of voltage levels at the terminals of the first transistor 301, now voltage signals 172-2, 174-2, 176-2 indicative of voltage levels at the terminals of the third transistor (monitored transistor associated with the L line) 401 are provided to the third fault detection circuit 146-2 for the L line. Otherwise, the same considerations as with regard to the third fault detection circuit 146-1 for the H line (see FIG. 9) apply, with obvious modifications.

Thus, the third fault detection circuit 146-2 for the L line comprises a third current detection sub-circuit 1010 for detecting a fourth quantity depending on the current flowing through the third transistor 401, and a third comparator 1040 for comparing the fourth quantity to a third threshold value. The third fault detection circuit 146-2 for the L line further comprises switching means 1050 (e.g. a controllable switch) and a capacitor 1060. The third current detection sub-circuit 1010 comprises a sub-circuit 1005, the configuration and function of which correspond to that of the second current detection sub-circuit 710 of the second fault detection circuit 144-2 for the L line illustrated in FIG. 7, to which reference is made for further details.

The third fault detection circuit 146-2 for the L line is adapted to raise a third error flag UCFL if the fourth quantity does not exceed the third threshold value. This error flag indicates an under-current (in forward-bias mode) at the L terminal. Further, this error flag may correspond to the output of the third comparator 1040. The third quantity not exceeding the third threshold value is an example of an error condition of the first quantity.

If both third fault detection circuits 146-1, 146-2 are provided, the fourth quantity may be detected and monitored (i.e. compared to respective third thresholds) for both the H line and the L line. In this case, the current detector of the transceiver 100 may further comprise a fourth transistor (detection transistor associated with the L line) 1015, and circuitry for applying the same voltages to the terminals of the fourth transistor 1015 as present at the terminals of the third transistor (monitored transistor associated with the L line) 401. In other words, the current detector may additionally comprise the third current detection sub-circuit 1010 of the third fault detection circuit 146-2 for the L line. Further, the failure determination circuit of the transceiver 100 may additionally comprise the comparator 1040 of the third fault detection circuit 146-2 for the L line and may be configured to output the third error flag for the L line (UCFL).

Returning to FIG. 1, the transceiver 100 may further comprise a fourth fault detection circuit (sampling current unbalance detection circuit) 148 for detecting an imbalance in the current flowing into the H line and out of the L line during the dominant state of the transceiver 100. Broadly speaking, the sampling current unbalance detector samples the current through the H and L port for the transceiver 100 in active, i.e. bus dominant, state and compares the H and L port current values. Deviations between the H and L port current values in excess of a preset value are indicative of either a short or open-circuit existing on the differential signaling bus. As a measure of safety, the bus-driver circuit 110 of the transceiver 100 may be switched off (i.e. the transceiver 100 may be returned to the inactive state) in such cases.

Figure 11:
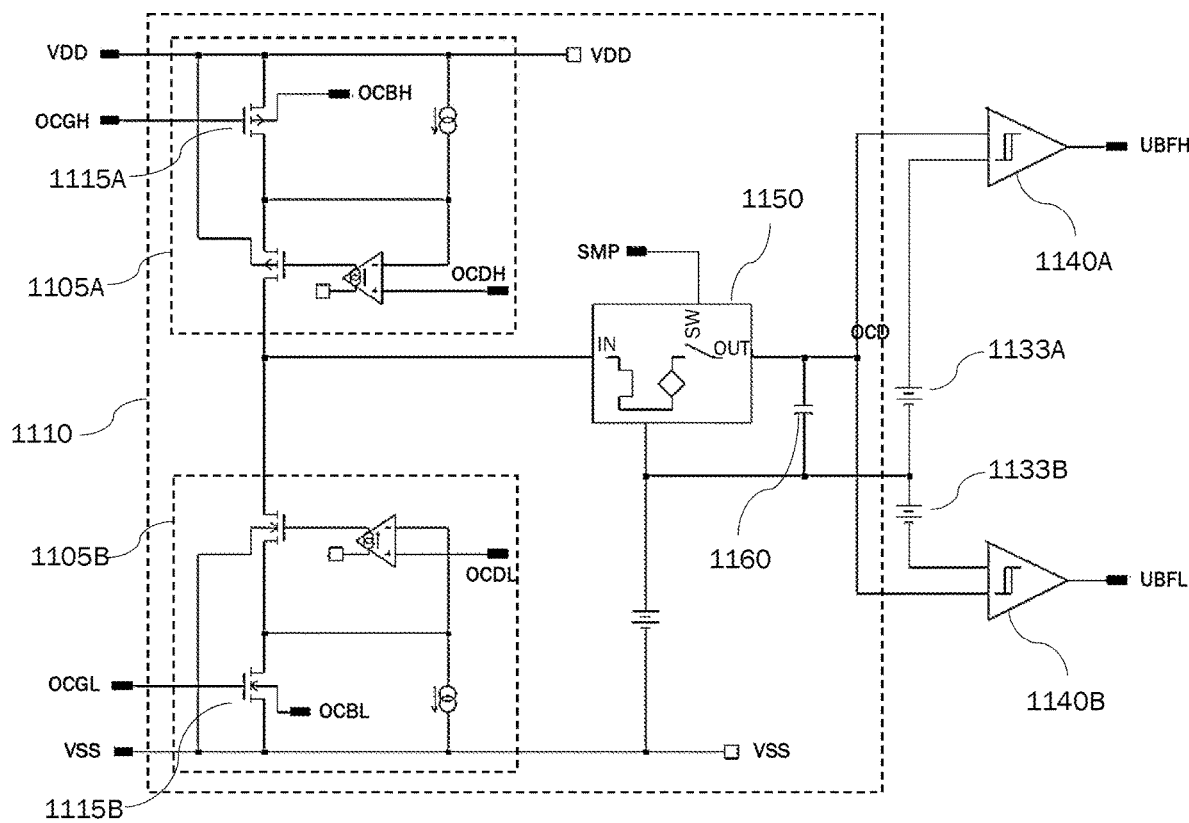

FIG. 11 schematically illustrates an example of the fourth fault detection circuit (sampling current unbalance detection circuit) 148. Broadly speaking, the sampling current unbalance detection circuit derives scaled-down versions of the two port currents, analogously to the over-current detection circuit for the forward-bias condition (see FIG. 5), and compares these scaled-down versions to each other to derive the difference current. This difference current is converted into a voltage and sampled to be compared with a maximum value for both positive and negative outcomes. Difference in H and L port currents in excess of this derived maximum value are indicative of part of the port currents having an alternative or no route to the supply, and are thus indicative of a short circuit failure or an open bus circuit.

Put differently, the sampling current unbalance detection circuit samples the current through the H and L terminals for the bus-driver circuit 110 in active, i.e. bus dominant, state and compares the H and L port current values. Deviations between the H and L port current values in excess of a preset value is indicative that either a short or open-circuit exists on the differential signaling bus. Presence of a failure indication of the second fault detection circuits 144-1, 144-2 (raising second error flags OCFH and OCFL) indicates that a short-circuit failure is present.

The fourth fault detection circuit 148 receives the voltage signals 172-1, 174-1, 176-1 that are indicative of, respectively, the voltages at the bulk terminal, the gate terminal, and the drain terminal of the first transistor (monitored transistor associated with the H line) 301, as well as the voltage signals 172-2, 174-2, 176-2 that are indicative of, respectively, the voltages at the bulk terminal, the gate terminal, and the drain terminal of the third transistor (monitored transistor associated with the L line) 401. The fourth fault detection circuit 148 comprises a fourth current detection sub-circuit 1110 for detecting a fifth quantity that depends on (is indicative of) an integrated value of sample values of respective differences between the current flowing in the first transistor (monitored transistor associated with the H line) 301 and the third transistor (monitored transistor associated with the L line) 401. The fourth current detection sub-circuit 1110 may obtain (sample) the sample values towards respective ends of periods in a sequence of periods in which the transceiver 100 is in the active state, similar to e.g. the third fault detection circuits 146-1, 146-2 described above. The fourth fault detection circuit 148 may further comprise a fourth comparator 1140A for comparing the fifth quantity to a fourth threshold value. The fifth quantity is an example (implementation) of the first quantity. The fourth threshold value may be supplied e.g. by a voltage source 1133A. The fourth fault detection circuit 148 is adapted to raise a fourth error flag UBFH if the fifth quantity exceeds the fourth threshold value. This error flag indicates an unbalance between the current flowing through the H terminal and the current flowing through the L terminal, i.e. the current flowing through the H terminal being larger than the current flowing through the L terminal beyond a predetermined threshold. Further, this error flag may correspond to the output of the fourth comparator 1140A. The fifth quantity exceeding the fourth threshold value is an example of an error condition of the first quantity. The fourth fault detection circuit 148 may further comprise another fourth comparator 1140B and another voltage source 1133B for comparing the negative of the fifth quantity (i.e. a sign-flipped version of the fifth quantity) to another fourth threshold value supplied by the other voltage source 1133B, and may be adapted to raise another fourth error flag UBFL if the inverse of fifth quantity does not exceed the other fourth threshold value.

The fourth current detection sub-circuit 1110 comprises a sub-circuit 1105A for detecting a scaled version of the current flowing through the first transistor 301 (i.e. into the H line), and a sub-circuit 1105B for detecting a scaled version of the current flowing through the third transistor 401 (i.e. out of the L line). The sub-circuit 1105A corresponds to the second current detection sub-circuit 510 of the second fault detection circuit 144-1 for the H line (see FIG. 5), except for that the sub-circuit 1105A does not comprise equivalents to the current-voltage converter 532 and the current source 531 of said second current detection sub-circuit 510. Accordingly, the sub-circuit 1105A comprises a second transistor (detection transistor associated with the H line) 1115A that is a scaled replica of the first transistor 301. The current flowing through the second transistor 1115A is output by the sub-circuit 1105A. For more details concerning the sub-circuit 1105A, reference is made to the description of the second current detection sub-circuit 510, which is directly applicable to said sub-circuit 1105A. The sub-circuit 1105B corresponds to the second current detection sub-circuit 710 of the second fault detection circuit 144-2 for the L line (see FIG. 7), except for that the sub-circuit 1105B does not comprise equivalents to the current-voltage converter 732 and the current source 731 of said second current detection sub-circuit 710. Accordingly, the sub-circuit 1105B comprises a fourth transistor (detection transistor associated with the L line) 115B that is a scaled replica of the third transistor 401. The current flowing through the fourth transistor 1115B is output by the sub-circuit 1105B. For more details concerning the sub-circuit 1105B, reference is made to the description of the second current detection sub-circuit 710, which is directly applicable to said sub-circuit 1105B.

The current detection sub-circuit 1110 comprises, in addition to the sub-circuits 1105A, 1105B, switching means (e.g. a controllable switch) 1150 and a capacitor 1160. The sub-circuit 1105A outputs a current depending on a current flowing through the first transistor 301 (i.e. indicative of a current flowing through the second transistor 1115A). The sub-circuit 1105B outputs a current depending on a current flowing through the third transistor 401 (i.e. indicative of a current flowing through the fourth transistor 1115B). The switching means 1150, under control of a sampling signal SMP that indicates the sampling timings, intermittently charges the capacitor 1160, i.e. charges the capacitor 1160 with a voltage derived from the difference between the current outputs of the sub-circuits 1105A, 1105B, at sampling timings indicated by the sampling signal SMP. As indicated above, these sampling timings are timings towards respective ends of dominant periods of the transceiver 100, or in more general terms, timings at which the currents in the respective lines of the differential signaling bus have already settled and are not subject to (significant) fluctuations that would otherwise interfere with the measurement.

If the transceiver 100 comprises the fourth fault detection circuit 148, the detection step S1201 in FIG. 12 may involve detecting a fifth quantity indicative of an integrated value of sample values of respective differences between the current flowing in the first transistor 301 and the current flowing through the third transistor. The sample values may be obtained (sampled) at timings towards respective ends of periods in a sequence of periods in which the transceiver 100 is in the active state. Detecting the fifth quantity may involve intermittently charging a capacitor 1160 at said timings by a voltage derived from a difference between a current flowing through the second transistor 1115A and a current flowing through the fourth transistor 1115B. As indicated above, the fifth quantity may be an example (implementation) of the first quantity. The failure determination step S1202 may involve comparing the detected fifth quantity to a fourth threshold, and determining that the first quantity satisfies an error condition if the detected fifth quantity exceeds the fourth threshold. The failure determination step S1202 may further involve comparing a negative (i.e. sign-flipped version) of the detected fifth quantity to another fourth threshold, and determining that the first quantity satisfies an error condition if the detected fifth quantity does not exceed the other fourth threshold.

In accordance with the above, the current detector of the transceiver 100 may comprise the second transistor (detection transistor) 1115A, and circuitry for applying the same voltages to the terminals of the second transistor 1115A as present at the terminals of the first transistor (monitored transistor) 301. The current detector of the transceiver 100 may further comprise the fourth transistor (detection transistor) 1115B, and circuitry for applying the same voltages to the terminals of the fourth transistor 1115B as present at the terminals of the third transistor (monitored transistor) 401. In other words, the current detector may comprise the fourth current detection sub-circuit 1110 of the fourth fault detection circuit 148. Accordingly, the current detector may be adapted to detect said fifth quantity. In particular, the current detector may be adapted to detect the fifth quantity by intermittently charging the capacitor 1160 at sampling timings e.g. towards respective ends of periods in which the transceiver 100 is in the dominant state, by a voltage derived from a difference between the current flowing through the second transistor 1115A and the current flowing through the fourth transistor 1115B. The fifth quantity may be indicative of a voltage across the capacitor 1160. Further, the failure determination circuit of the transceiver 100 may comprise either or both of the fourth comparators 1140A, 1140B of the fourth fault detection circuit 148 and may be configured to output the fourth error flag(s) (UBFH, UBFL).

While the detection of over-current conditions protects the bus-driver circuit 110 against excessive currents in both forward-bias and reverse-bias conditions, it may be preferably for shorts to very high or low voltages that the bus-driver circuit 110 is not activated at all. Such conditions can be identified using the over-voltage detector described next.

Returning to FIG. 1, the transceiver may further comprise up to four fifth fault detection circuits (positive and negative over-voltage detection circuits) 152-1, 152-2, 154-1, 154-2 respectively adapted to detect a positive over-voltage at the H line, a positive over-voltage at the L line, a negative over-voltage at the H line, and a negative over-voltage at the L line. The fifth fault detection circuits 152-1, 154-1 for the H line receive an input indicative of the (instant) voltage at the H terminal. For example, the fifth fault detection circuits 152-1, 154-1 for the H line may be connected to the H line. The fifth fault detection circuits 152-2, 154-2 for the L line receive an input indicative of the (instant) voltage at the L terminal. For example, the fifth fault detection circuits 152-2, 154-2 for the L line may be connected to the L line.

In accordance with the above, the transceiver 100 may comprise a voltage detector that is adapted to detect a sixth quantity depending on a voltage level at the H terminal. The transceiver 100 may further comprise circuitry for comparing the detected sixth quantity to at least one fifth threshold (e.g. one or two fifth thresholds), e.g. by means of one or more comparators (the number of comparators corresponding to the number of fifth thresholds) and for outputting a fifth error flag (OVPH, OVNH) if the detected sixth quantity is not within a range determined by the at least one fifth threshold. If the detected sixth quantity exceeds an upper one (a highest one, e.g. a most positive one) of the fifth thresholds, a fifth error flag indicating a positive over-voltage at the H line (OVPH) may be raised. If the detected sixth quantity does not exceed a lower one (a lowest one, e.g. a most negative one) of the fifth thresholds, a fifth error flag indicating a negative over-voltage at the H line (OVNH) may be raised.

If the transceiver 100 comprises one or both of the fifth fault detection circuits 152-1, 154-1, 148, the detection step S1201 in FIG. 12 may involve detecting a sixth quantity depending on a voltage level at the output terminal. The failure determination step S1202 may involve comparing the detected sixth quantity to the at least one fifth threshold. Further, the control step may involve switching the transceiver to the inactive state if the detected sixth quantity is not within a range determined by the at least one fifth threshold, e.g. if the detected sixth quantity exceeds an upper one (a highest one, e.g. a most positive one) of the fifth thresholds or does not exceed a lower one (a lowest one, e.g. a most negative one) of the fifth thresholds. The detection step S1201 in FIG. 12 may involve detecting a sixth quantity depending on a voltage level at either output terminal (or both output terminals), with evident modifications to the remaining steps.

Accordingly, the transceiver 100 may comprise a voltage detector that is adapted to detect a sixth quantity depending on a voltage level at the L terminal. The transceiver 100 may further comprise circuitry for comparing this detected sixth quantity to at least one fifth threshold (e.g. one or two fifth thresholds), e.g. by means of one or more comparators (the number of comparators corresponding to the number of fifth thresholds) and for outputting a fifth error flag (OVPL, OVNL) if the detected sixth quantity is not within a range determined by the at least one fifth threshold. If the detected sixth quantity exceeds an upper one (a highest one, e.g. a most positive one) of the fifth thresholds, a fifth error flag indicating a positive over-voltage at the L line (OVPL) may be raised. If the detected sixth quantity does not exceed a lower one (a lowest one, e.g. a most negative one) of the fifth thresholds, a fifth error flag indicating a negative over-voltage at the L line (OVNL) may be raised.

Returning to FIG. 1, the transceiver may further comprise a sixth fault detection circuit (sampled under-voltage detection circuit) 156 for detecting an under-voltage of the sampled differential voltage between the H terminal and the L terminal. A sampled value of the difference voltage on the H and L terminals in a state in which the bus-driver circuit 110 is active and the signal have settled on the differential signaling bus is indicative of an impedance present between the H and L terminals. A sampled differential voltage below a given threshold indicates a short between the H and L lines of the differential signaling bus. Put differently, the output of the bus-receiver circuit 120 is sampled at the end of the dominant period, after all the signals in the driver and the bus have settled. This value can be compared with the minimum voltage that the driver should realize on a fault free bus. Consequently, failure to reach this minimum differential voltage on the bus is indicative of a short between the H and L bus lines or a short of the H and L bus lines to an external conductor.

The sixth fault detection circuit (sampled under-voltage detection circuit) 156 detects a seventh quantity depending on a difference between the voltage level at the output terminal and a voltage level at the second output terminal. The seventh quantity may be sampled at timings at or towards respective ends of periods in which the transceiver 100 is in the active state, similar to e.g. the case of the third fault detection circuits 146-1, 146-2 or the fourth fault detection circuit 148 described above. The sampling may be performed by intermittently charging a capacitor of the sixth fault detection circuit 156 by the difference voltage between the voltage level at the H terminal, V(H), and the voltage level at the L terminal, V(L), at respective sample timings towards respective ends of periods in a sequence of periods in which the transceiver 100 is in the active state. The sixth fault detection circuit 156 compares the detected seventh quantity to a sixth threshold, and raises a sixth error flag (RX_SMP) if the seventh quantity does not exceed the sixth threshold.

In other word, the transceiver 100 may comprise a voltage detector for detecting a seventh quantity depending on a difference between the voltage level at the output terminal and a voltage level at the second output terminal. The voltage detector may be adapted to sample the seventh quantity at timings at or towards respective ends of periods in which the transceiver 100 is in the active state. The transceiver 100 may further comprise circuitry for comparing the detected seventh quantity to a sixth threshold and for outputting a sixth error flag if the detected seventh quantity does not exceed the sixth threshold. The control circuit 130 may be adapted to switch the transceiver 100 to the inactive state if the sixth error flag is raised.

Accordingly, the detection step S1201 in FIG. 12 may involve detecting a seventh quantity depending on a difference between the voltage level at the (first) output terminal and a voltage level at the second output terminal (i.e. at the H terminal and the L terminal). Detecting the seventh quantity may involve intermittently charging a capacitor by the difference voltage between the voltage level at the H terminal, V(H), and the voltage level at the L terminal, V(L), at respective sample timings towards respective ends of periods in a sequence of periods in which the transceiver 100 is in the active state. The failure determination step S1202 may involve comparing the detected seventh quantity to a sixth threshold. The control step S1204 may involve switching the transceiver 100 (i.e. the bus-driver circuit 110) to the inactive state if the detected seventh quantity does not exceed the sixth threshold.

The third, fourth, and sixth fault detection circuits 146-1, 146-2, 148, 156 require the operation of the bus-driver circuit 110 to induce the dominant state on the bus. This will only be possible provided that the bus is by default in the recessive state. Failure to detect the recessive state of the bus after a given period of time is also indicative of a failure of the bus. Accordingly, a seventh error flag (RX) may be raised, and the transceiver 100 may be returned to the recessive state if the seventh error flag is raised.

A summary of error flags that can be raised be the fault detection circuits of the transceiver 100 according to embodiments of the disclosure is provided next. The state of the bus-driver circuit 110 is indicated by error flags OCRH, OCRL (first error flags), OCFH, OCFL (second error flags), and OVHP, OVHN, OVLP, OVLN (fifth error flags). Of these, OCRH indicates an over-current for the H port at voltages above VDD, OCRL indicates an over-current for the L port at voltages below VSS, OCFH indicates an over-current for the H port at voltages below VDD, OCFL indicates an over-current for the L port at voltages above VSS, OVHP indicates an over-voltage for the H port at voltages in excess of VDD, OVHN indicates an over-voltage for the H port at voltages lower than VSS, OVLP indicates an over-voltage for the L port at voltages higher than VDD, and OVLN indicates an over-voltage for the L port at voltages lower than VSS. The state of the differential signaling bus is indicated by error flags UCFH, UCFL (third error flags), UBFH, UBFL (fourth error flags), RX_SMP (sixth error flag), and RX (seventh error flag). Of these, UCFH indicates that the current for the H port for the dominant state is too low, UCFL indicates that the current for the L port for the dominant state is too low, UBFH indicates that the current for the H port is significantly smaller than that of the L port, UBFL indicates that the current for the L port is significantly smaller than that of the H port, RX_SMP indicates that the differential voltage in the dominant state is not sufficient (e.g. due to presence of a short-circuit failure), and RX indicates the bus state, i.e. in case that a dominant state is detected for too long a bus failure is indicated by raising error flag RX.

Once the sampled current and voltage measurements have been performed and the bus failure state has been detected, failure propagation can be prevented by disabling the transceiver 100.

The above error flags allow disabling the bus-driver circuit 110 on occurrence of an abnormal state, thereby preventing the bus-driver circuit 110 from taking damage, and thus increasing the lifetime of the bus-driver circuit 110. In addition, analyzing the error flags allows to infer the state of the differential signaling bus. Namely, the state of the differential signaling bus can be determined through the sampled unbalance detector (fourth fault detection circuit 148) and sampled under-current detectors (third fault detection circuits 146-1, 146-2), together with the driver in the dominant state (error flag RX). A single open circuit H or L bus line is detected by the sampled H or L under-current detectors, respectively. A double open circuit for both H and L bus lines is detected by the H and L sampled under-current detectors. A short-circuit of the H or L bus line is detected by the sampled unbalance current detector. A higher H than L port current is indicative of a short circuit of the H bus line to a voltage below the supply, or an open circuit of the L bus line, or of a short circuit of the L bus line to a voltage below ground. Reversely, a higher L than H port current is indicative of a short circuit of the L bus line to a voltage larger than the ground supply, or an open circuit of the H bus line, or of a short circuit of the H bus line to a voltage higher than the supply voltage. A short circuit between the H and L bus lines will be detected by the sampled receiver output (sixth fault detection circuit 156). These bus conditions can be detected within one transmitted dominant bit, in contrast to current CAN transceiver implementations. Nominally, a faster response is possible provided that the bus has settled. Notably, all open circuit and short circuit conditions can be detected, and the exact nature of the bus failure can be determined.

As indicated above, the over-current detectors (first fault detection circuits 142-1, 142-2 and second fault detection circuits 144-1, 144-2) and under-current detectors (third fault detection circuits 146-1, 146-2) together with the over-voltage detectors (fifth fault detection circuits 152-1, 152-2, 154-1, 154-2) will detect excessive current and voltage conditions for the bus-driver circuit 110 and with the deactivation of the bus-driver circuit 110 allow for the protection of the bus-driver circuit 110. The control circuit 130 may be triggered by an OR-combination of the error flags described in the present disclosure.

The transceiver 100 may comprise any or all of the fault detection circuits described above. In a preferred embodiment, the transceiver 100 comprises the first fault detection circuits 142-1, 142-2 for the H and L lines, respectively. In another preferred embodiment, the transceiver 100 further comprises the second fault detection circuits 144-1, 144-2 for the H and L lines, respectively. In yet another preferred embodiment, the transceiver 100 further comprises the third fault detection circuits 146-1, 146-2 for the H and L lines, respectively. In yet another preferred embodiment, the transceiver 100 further comprises the fourth fault detection circuit 148. In yet another preferred embodiment, the transceiver 100 further comprises the fifth fault detection circuits 152-1, 152-2, 154-1, 154-2 for the H and L lines, respectively. In yet another preferred embodiment, the transceiver 100 further comprises the sixth fault detection circuit 156.

Broadly speaking, the main technical effects achieved by the present disclosure are twofold. Firstly, a transceiver (e.g. CAN transceiver) can be realized without blocking diodes or bipolar transistors on the ports. This is achieved by with the prevention of leakage in the recessive state of the bus-driver circuit 110 through well-leakage prevention with common paired well connections, reverse channel leakage prevention with series coupled MOS transistors, and by protection of the bus-driver circuit 110 in the dominant state through deactivation by reverse over-current detection for both H and L ports, forward over-current detection for both H and L ports, and prevention of the driver to enter the dominant state upon over-voltage detection for both H and L ports. Secondly, the bus state can be determined through the reuse of the port current measurement circuits for the over-current detection in sampled mode during the bus-driver circuit dominant state by driver port H and L under-current detection, driver port H and L current unbalance detection, and determination of the driver induced minimum differential bus voltage by the sampled receiver. This allow for bus state determination in terms of single and/or double open and short-circuited bus lines. These two technical effects are linked since the over-current and over-voltage detection circuits not only indicate the excessive operating state of the driver, but can also determine the state of the differential signaling bus. The differential signaling bus status information can further be complemented with sampled current measurement of the driver and receiver to give a comprehensive indication of whether the bus failure occurs through single or double open or short circuits. The status of bus failure and appropriate response at chip or system level prevents further failure propagation to occur on the bus network.

Next, simulation results for exemplary operation of the transceiver 100 according to embodiments of the disclosure will be described.

FIG. 13 illustrates waveforms that may occur during normal operation of the transceiver 100, including the forward-bias over-current signals (error flags) OCFH and OCFL for the H line and L line, respectively. Waveforms 1310-1360 indicate, from top to bottom, the forward-bias over-current signal OCFL for the L line, the forward-bias over-current signal OCFH for the H line, the voltage level at the L terminal, the voltage level at the H terminal, the received signal RXD, and the transmit signal TXD. The forward-bias over-current error flags for the H and L terminals are not activated (i.e. are zero), as no excess current is detected.

Shortening, for example, the H bus line (H line) to 500 mV causes an excess current to flow into the H terminal (H port) of the bus-driver circuit 110. This is detected by the forward-bias over-current detector as illustrated in FIG. 14, in which waveforms 1410-1460 are the same as the waveforms in FIG. 13. The error flag OCFH is raised as soon as the transmit signal TXD goes to the high state (dominant bit), indicating an over-current flowing through the H terminal in forward-bias direction. The same over-current detection functionality, although not shown here, also applies for the L terminal. It is to be noted that for this short circuit failure, the bus-receiver circuit 120 also cannot detect the transmitted dominant state of the bus.

For short circuits of the H and L ports to modest voltages, the lifetime operation of the driver can be guaranteed with the detection of these over-current conditions, by setting the bus-driver circuit 110 in the recessive state. However, for excessive short-circuit voltages this is no longer the case and the bus-driver circuit 110 should preferably not even be switched on. These conditions are detected by the over-voltage detectors for both forward and reverse short-circuit voltages. Simulation results for the over-voltage detection circuits are presently omitted.

Figure 15:
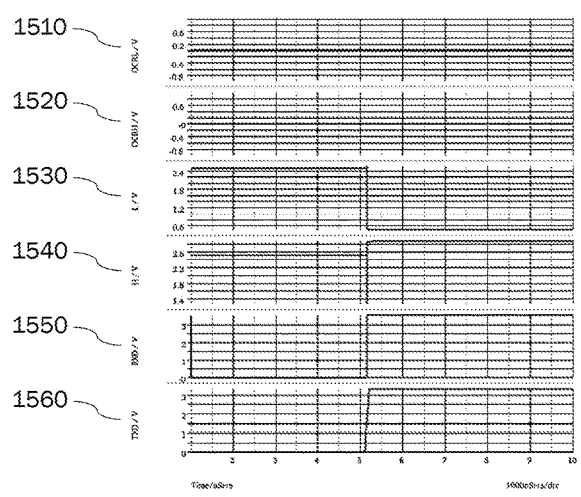

FIG. 15 illustrates further waveforms that may occur during normal operation of the transceiver 100, including the reverse-bias over-current signals (error flags) OCRH and OCRL for the H line and L line, respectively. Waveforms 1510-1560 indicate, from top to bottom, the reverse-bias over-current signal OCRL for the L line, the reverse-bias over-current signal OCRH for the H line, the voltage level at the L terminal, the voltage level at the H terminal, the received signal RXD, and the transmit signal TXD. The reverse-bias over-current error flags for the H and L terminals are not activated (i.e. are zero), as no excess current is detected.

Figure 16:
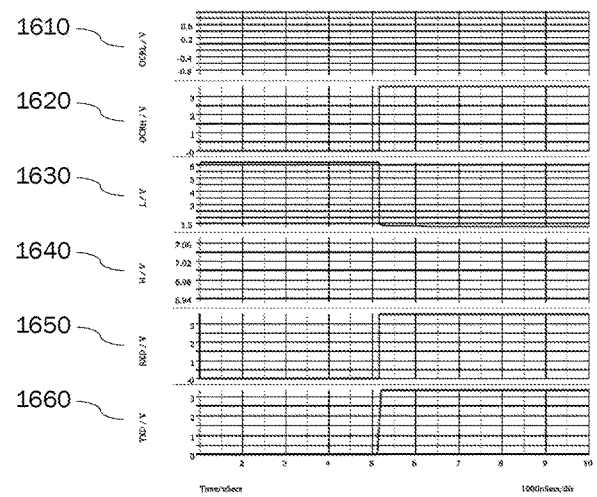

However, with the H bus line shorted to 7V, for example, the H port on the driver in dominant mode will draw an excess current. This is detected by the reverse-bias over-current detector as shown in the waveforms of FIG. 16. The waveforms 1610-1660 shown in this figure are the same as in FIG. 15. The error flag OCRH is raised as soon as the transmit signal TXD goes to the high state (dominant bit), indicating an over-current flowing through the H terminal in reverse-bias direction. The same over-current detection functionality, although not shown here, also applies for the L terminal. It is to be noted that in this case, the bus-receiver circuit 120 is still able to decode the transmitted signal.

Figure 17:
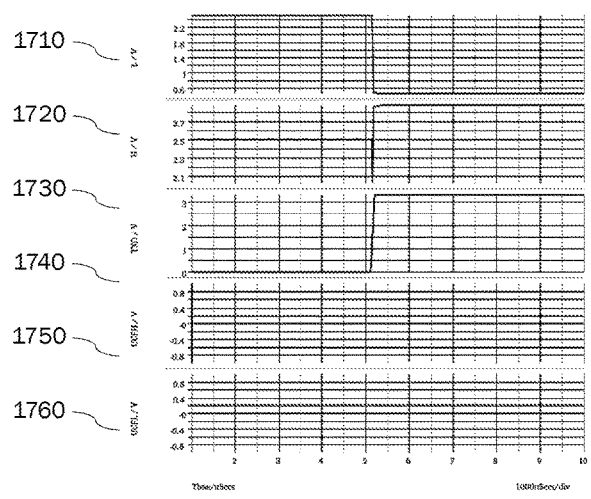

FIG. 17 illustrates further waveforms that may occur during normal operation of the transceiver 100, including the (forward-bias) under-current signals (error flags) UCFH and UCFL for the H line and L line, respectively. Waveforms 1710-1750 indicate, from top to bottom, the voltage level at the L terminal, the voltage level at the H terminal, the transmit signal TXD, the under-current signal UCFH for the H line, and the under-current signal UCFL for the L line. The driver is in recessive state and switches to dominant state at t=5 μs. No open circuit exist on the bus line and all the signals are nominal. In particular, the (forward-bias) under-current error flags for the H and L terminals are not activated (i.e. are zero), as no under-current is detected.

Figure 18:
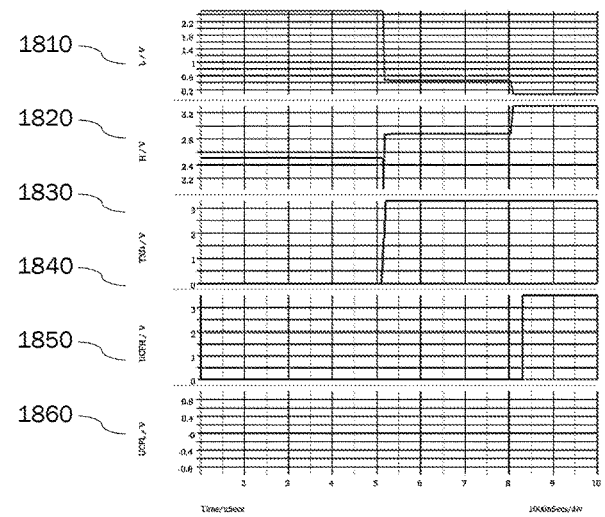

If now, for example, the H port is disconnected from the H bus line, the current flowing out of the H port reduces and drops below the set threshold and triggers the under-current detector for the H port. This is illustrated in FIG. 18, in which the waveforms 1810-1850 are the same as in FIG. 17. At t=8 μs, the H port of the transceiver is disconnected from the H bus line. Accordingly, the error flag UCFH flag is activated and will be sampled at the end of the dominant bit transmission.

FIG. 19 illustrates further waveforms that may occur during normal operation of the transceiver 100, including the (forward-bias) current unbalance signals UBFH and UBFL for the H line and L line, respectively. Waveforms 1910-1960 indicate, from top to bottom, the differential voltage V(H)−V(L), the voltage level at the L terminal, the voltage level at the H terminal, the transmit signal TXD, the (forward-bias) current unbalance signal UBFH for the H line, and the (forward-bias) current unbalance signal UBFL for the L line. The driver is in recessive state and switches to dominant state at t=10 μs and back to the recessive state at t=15 μs. No short-circuit exists on the bus line and all the signals are nominal. In particular, the (forward-bias) current unbalance error flags for the H and L terminals are not activated (i.e. are zero), as no current unbalance is detected.

However, once the H port is short circuited to a fixed voltage, e.g. 3V, there will be a difference in the current flowing in and out of the H and L ports. This is illustrated in FIG. 20, in which the waveforms 2010-2060 are the same as in FIG. 19. At t=8 μs, the H port is disconnected from the H bus line. At t=12 μs, the H bus line is short circuited to 3V, causing an imbalance in the H and L port currents. This unbalance, and accordingly the short circuit on the H line is detected by the unbalance current detector and sampled at the end of the dominant bit transmission. Accordingly, the error flag UBFL is activated once the H bus line is short circuited to 3V.

Figure 21:
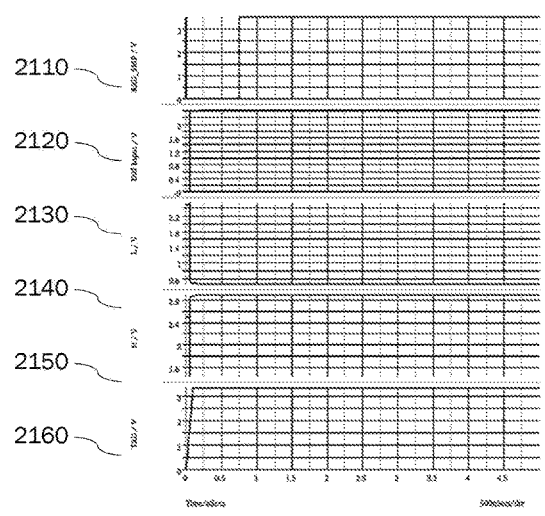
Figure 22:
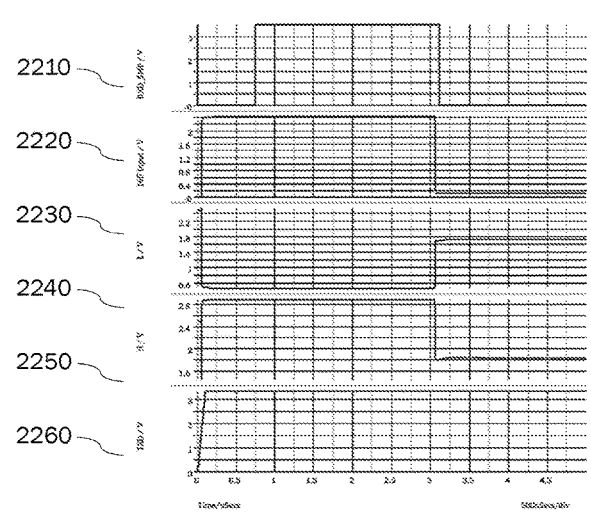

The bus line receiver with adjusted threshold can be used to sample the differential bus line voltage and compare it to the minimum differential voltage requirement. Failure to reach this voltage is indicative that a short between the H and L bus line, or a short of one of the bus lines with a voltage close to that of the other bus line, has occurred. This is illustrated in FIG. 21 and FIG. 22. In FIG. 21, the waveforms 2110-2150 indicate, from top to bottom, the sampled receive signal RX_SMP, the differential voltage V(H)−V(L), the voltage level at the L terminal, the voltage level at the H terminal, and the transmit signal TXD. All the signals are nominal. FIG. 22 shows the case that a short between the H and L bus lines is applied at t=3 s. The waveforms 2210-2260 are the same as in FIG. 21. Applying the short between the H and L bus lines reduces the bus differential voltage below the minimum requirement and this is detected by the RX_SMP flag in that it does not track the driver transmit state. A sampled version of the bus line receive state is necessary to ensure that the voltage on the bus line has settled to ensure that no erroneous failure detections take place. The receiver state is sampled with the driver data signal TXD, such that the final bus state will be sampled and held once it has settled at the end of the transmitted dominant bit. This can be compared to the transmitted state.

While the present disclosure frequently makes reference to a CAN bus, it is not to be construed as limited in its applicability to CAN buses. Instead, the present disclosure is to be understood to relate to and be applicable to any uni-polar differential signaling bus. Likewise, the present disclosure is not to be construed as limited in its applicability to spacecraft.

Further, while the present disclosure relates to current detection via scaled replica of monitored transistors, the present disclosure is not to be construed to be limited to this kind of current detection, and alternative means for detecting currents may also be applied. For instance, a series resistor may be arranged in series with the respective monitored transistor, and a voltage indicative of a current flowing through the respective monitored transistor may be detected at the series resistor.

It should also be noted that the apparatus features described above correspond to respective method features that may not be explicitly described, for reasons of conciseness, and vice versa. The disclosure of the present document is considered to extend also to such method features, and vice versa.

It should further be noted that the description and drawings merely illustrate the principles of the proposed method and apparatus. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method and apparatus. Furthermore, all statements herein providing principles, aspects, and embodiments of the invention, as well as specific examples thereof, are intended to encompass equivalents thereof.

The invention claimed is:

1. A method of operating a transceiver for imparting a voltage signal on a differential signaling bus, wherein the transceiver comprises an output terminal and a string of one or more transistors connected between the output terminal and a predetermined voltage level, and wherein the transceiver can be switched between an active state in which the predetermined voltage level is applied to the output terminal, and an inactive state in which the predetermined voltage level is not applied to the output terminal, the method comprising:
   a detection step comprising detecting a first quantity depending on a current flowing through a first transistor in the string of the one or more transistors;
   a failure determination step comprising determining whether the detected first quantity satisfies one or more error conditions; and
   a control step comprising switching the transceiver to the inactive state if the detected first quantity is determined to satisfy at least one of the one or more error conditions;
   wherein the detection step further comprises detecting a third quantity indicative of a current flowing through the first transistor in a second direction opposite to a first direction of current flow; and
   the failure determination step further comprises:
   comparing the detected third quantity to a second threshold; and
   determining that the first quantity satisfies an error condition if the detected third quantity exceeds the second threshold.

2. The method according to claim 1,
   wherein the detection step further comprises detecting a second quantity indicative of the current flowing through the first transistor in the first direction; and
   the failure determination step further comprises:
   comparing the detected second quantity to a first threshold; and
   determining that the first quantity satisfies an error condition if the detected second quantity exceeds the first threshold.

3. The method according to claim 1,
   wherein the detection step further comprises detecting a fourth quantity indicative of an integrated value of sample values of respective currents flowing through the first transistor at timings towards respective ends of periods in a sequence of periods in which the transceiver is in the active state; and
   the failure determination step further comprises:
   comparing the detected fourth quantity to a third threshold; and
   determining that the first quantity satisfies an error condition if the detected fourth quantity does not exceed the third threshold.

4. The method according to claim 3, wherein the detection step further comprises:
   providing a second transistor that is a scaled copy of the first transistor; and
   applying same voltages to the terminals of the second transistor that are present at respective terminals of the first transistor.

5. The method according to claim 4, wherein detecting the fourth quantity comprises intermittently charging a capacitor at the timings towards the respective ends of said periods by a voltage derived from current flowing through the second transistor.

6. The method according to claim 4,
   wherein the transceiver further comprises a second output terminal and a second string of one or more transistors connected between the second output terminal and a second predetermined voltage level, wherein the second predetermined voltage level is applied to the second output terminal during the active state of the transceiver, and wherein the second predetermined voltage level is not applied to the second output terminal during the inactive state of the transceiver;
   the detection step further comprises detecting a fifth quantity indicative of an integrated value of sample values of respective differences between the current flowing in the first transistor and a current flowing in a third transistor in the second string at timings towards respective ends of periods in a sequence of periods in which the transceiver is in the active state; and
   the failure determination step further comprises:
   comparing the detected fifth quantity to a fourth threshold; and determining that the first quantity satisfies an error condition if the detected fifth quantity exceeds the fourth threshold.

7. The method according to claim 6, wherein the detection step further comprises:
providing a fourth transistor that is a scaled copy of the third transistor; and
applying same voltages to the terminals of the fourth transistor that are present at respective terminals of the third transistor; and
detecting the fifth quantity involves intermittently charging a second capacitor at the timings towards the respective ends of said periods by a voltage derived from a difference between a current flowing through the second transistor and a current flowing through the fourth transistor.

8. The method according to claim 1, wherein:
the detection step further comprises detecting a sixth quantity depending on a voltage level at the output terminal;
the failure determination step further comprises comparing the detected sixth quantity to at least one fifth threshold; and
the control step further comprises switching the transceiver to the inactive state if the detected sixth quantity is not within a range determined by the at least one fifth threshold.

9. The method according to claim 1,
wherein the transceiver further comprises a second output terminal and a second string of one or more transistors connected between the second output terminal and a second predetermined voltage level, wherein the second predetermined voltage level is applied to the second output terminal during the active state of the transceiver, and wherein the second predetermined voltage level is not applied to the second output terminal during the inactive state of the transceiver;
the detection step further comprises detecting a seventh quantity depending on a difference between the voltage level at the output terminal and a voltage level at the second output terminal;
the failure determination step further comprises comparing the detected seventh quantity to a sixth threshold; and
the control step further comprises switching the transceiver to the inactive state if the detected seventh quantity does not exceed the sixth threshold.

10. A transceiver for imparting a voltage signal on a differential signaling bus, comprising an output terminal and a string of one or more transistors connected between the output terminal and a predetermined voltage level, and being switchable between an active state in which the predetermined voltage level is applied to the output terminal, and an inactive state in which the predetermined voltage level is not applied to the output terminal, the transceiver further comprising:
a current detector configured to detect a first quantity depending on a current flowing through a first transistor in the string of transistors;
a failure determination circuit configured to determine whether the detected first quantity satisfies one or more error conditions; and
a control circuit configured to switch the transceiver to the inactive state if the detected first quantity is determined to satisfy at least one of the one or more error conditions;

wherein the current detector is further configured to detect a third quantity indicative of a current flowing through the first transistor in a second direction opposite to a first direction of current flow; and
the failure determination circuit comprises a second comparator that is configured to compare the detected third quantity to a second threshold and to output a second error flag indicating that the first quantity satisfies an error condition if the detected third quantity exceeds the second threshold.

11. The transceiver according to claim 10,
wherein the current detector is further configured to detect a second quantity indicative of the current flowing through the first transistor in the first direction; and
wherein the failure determination circuit comprises a first comparator that is configured to compare the detected second quantity to a first threshold and to output a first error flag indicating that the first quantity satisfies an error condition if the detected second quantity exceeds the first threshold.

12. The transceiver according to claim 10,
wherein the current detector is further configured to detect a fourth quantity indicative of an integrated value of sample values of respective currents flowing through the first transistor at timings towards respective ends of periods in a sequence of periods in which the transceiver is in the active state; and
the failure determination circuit comprises a third comparator that is configured to compare the detected fourth quantity to a third threshold and to output a third error flag indic ating that the first quantity satisfies an error condition if the detected fourth quantity does not exceed the third threshold.

13. The transceiver according to claim 12, wherein the current detector comprises:
a second transistor that is a scaled copy of the first transistor; and
a supply circuit adapted to apply the same voltages to the terminals of the second transistor that are present at respective terminals of the first transistor.

14. The transceiver according to claim 13, wherein the current detector comprises a capacitor and switching means for intermittently charging the capacitor; and
the current detector is configured to detect the fourth quantity by intermittently charging the capacitor at the timings towards the respective ends of said periods by a voltage derived from the current flowing through the second transistor.

15. The transceiver according to claim 13, further comprising:
a second output terminal and a second string of one or more transistors connected between the second output terminal and a second predetermined voltage level, wherein the second predetermined voltage level is applied to the second output terminal during the active state of the transceiver, and wherein the second predetermined voltage level is not applied to the second output terminal during the inactive state of the transceiver,
wherein the current detector is configured to detect a fifth quantity indicative of an integrated value of a difference between the current flowing in the first transistor and a current flowing in a third transistor in the second string; and
the failure determination circuit comprises a fourth comparator configured to compare the detected fifth quantity to a fourth threshold, and to output a fourth error flag indicating that the first quantity satisfies an error condition if the determined fifth quantity exceeds the fourth threshold.

16. The transceiver according to claim 15, wherein the current detector comprises:
a fourth transistor that is a scaled copy of the third transistor;
a second supply circuit configured to apply the same voltages to the terminals of the fourth transistor that are present at respective terminals of the third transistor;
a second capacitor; and
second switching means for intermittently charging the second capacitor,
wherein the current detector is configured to intermittently charge the second capacitor at the timings towards the respective ends of said periods by a voltage derived from a difference between a current flowing through the second transistor and a current flowing through the fourth transistor; and
the fifth quantity is indicative of a voltage across the second capacitor.

17. The transceiver according to claim 10, further comprising:
a voltage detector configured to detect a sixth quantity depending on a voltage level at the output terminal; and
circuitry configured to compare the detected sixth quantity to at least one fifth threshold and output a fifth error flag if the detected sixth quantity is not within a range determined by the at least one fifth threshold,
wherein the control circuit is configured to switch the transceiver to the inactive state if the fifth error flag is raised.

18. The transceiver according to claim 10, further comprising:
a second output terminal and a second string of one or more transistors connected between the second output terminal and a second predetermined voltage level, wherein the second predetermined voltage level is applied to the second output terminal during the active state of the transceiver, and wherein the second predetermined voltage level is not applied to the second output terminal during the inactive state of the transceiver;
a voltage detector configured to detect a seventh quantity depending on a difference between the voltage level at the output terminal and a voltage level at the second output terminal; and
circuitry configured to compare the detected seventh quantity to a sixth threshold and for outputting a sixth error flag if the detected seventh quantity does not exceed the sixth threshold,
wherein the control circuit is configured to switch the transceiver to the inactive state if the sixth error flag is raised.

* * * * *